(12) United States Patent
Nilsson et al.

(10) Patent No.: US 7,216,116 B1
(45) Date of Patent: *May 8, 2007

(54) DATA ANALYSIS SYSTEM WITH AUTOMATED QUERY AND VISUALIZATION ENVIRONMENT SETUP

(75) Inventors: Martin B. Nilsson, Cambridge, MA (US); Anders S. Fasth, Göteborg (SE); Christopher Ahlberg, Watertown, MA (US); Staffan Truvé, Alingsås (SE); Erik Wistrand, Göteborg (SE)

(73) Assignee: Spotfire AB, Göteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/865,163

(22) Filed: May 23, 2001

Related U.S. Application Data

(63) Continuation-in-part of application No. 09/479,194, filed on Jan. 7, 2000, now abandoned, which is a continuation-in-part of application No. 08/850,828, filed on May 2, 1997, now Pat. No. 6,014,661.

(60) Provisional application No. 60/019,049, filed on May 6, 1996.

(51) Int. Cl.
    G06F 17/30    (2006.01)
    G06F 15/18    (2006.01)
(52) U.S. Cl. ............ 707/3; 707/7; 705/10; 706/61
(58) Field of Classification Search ........ 345/156–157, 345/672, 682, 648, 687, 856, 835, 764, 780, 345/771; 707/3, 4, 5, 7, 104.1; 705/10, 705/7; 706/61
See application file for complete search history.

(56) References Cited

U.S. PATENT DOCUMENTS

| | | | |
|---|---|---|---|
| 3,296,597 A | 1/1967 | Scantlin et al. | |
| 4,752,889 A | 6/1988 | Rappaport et al. | 706/11 |
| 4,823,306 A | 4/1989 | Barbic et al. | 364/900 |
| 5,224,206 A | 6/1993 | Simoudis | 395/77 |
| 5,237,498 A | 8/1993 | Tenma et al. | 705/30 |
| 5,261,093 A * | 11/1993 | Asmuth | 707/2 |
| 5,317,647 A | 5/1994 | Pagallo | 382/161 |
| 5,335,345 A | 8/1994 | Frieder et al. | 395/600 |
| 5,454,104 A | 9/1995 | Steidlmayer et al. | 707/4 |
| 5,499,368 A | 3/1996 | Tate et al. | 707/4 |
| 5,526,257 A | 6/1996 | Lerner | 705/10 |
| 5,535,382 A | 7/1996 | Ogawa | 395/600 |
| 5,574,909 A * | 11/1996 | Misono et al. | 707/1 |
| 5,584,025 A | 12/1996 | Keithley et al. | 707/104 |
| 5,594,897 A | 1/1997 | Goffman | 395/613 |
| 5,608,899 A | 3/1997 | Li et al. | 395/604 |

(Continued)

OTHER PUBLICATIONS

Ahlberg et al, "Dynamic Queries for Information Exploration: An Implementation and Evaluation", ACM 1992, pp. 619-626.*

(Continued)

*Primary Examiner*—Uyen Le
(74) *Attorney, Agent, or Firm*—Kristofer E. Elbing

(57) ABSTRACT

A primary graphical input device such as a scroll bar or slider is displayed in order to allow graphical input and adjustment of at least one parameter, such as the page number of a displayed document in a word-processing program or a range value in a data visualization routine. Whenever a user activates the graphical input device, the user may set and change the parameter not only purely graphically, as in conventional applications, for example by dragging some portion of the primary device by moving a mouse, but also by entering a specific value into the secondary graphical input device, for example, via a keyboard. The invention thus provides an intuitive way for a user to quickly and easily navigate graphical objects not only by using pointing devices, but also by entering alphabetic or numeric input, all while maintaining the inherent advantages of "point and click" graphical displays.

26 Claims, 11 Drawing Sheets

U.S. PATENT DOCUMENTS

| | | | | |
|---|---|---|---|---|
| 5,615,347 A * | 3/1997 | Davis et al. | ................ | 345/833 |
| 5,623,652 A | 4/1997 | Vora et al. | .................... | 707/10 |
| 5,640,553 A | 6/1997 | Schultz | ........................ | 395/605 |
| 5,657,437 A * | 8/1997 | Bishop et al. | .............. | 715/503 |
| 5,682,490 A * | 10/1997 | Sumino et al. | ............. | 345/840 |
| 5,734,888 A | 3/1998 | Li et al. | ........................ | 395/604 |
| 5,745,103 A * | 4/1998 | Smith | ........................ | 345/601 |
| 5,768,578 A | 6/1998 | Kirk et al. | ................... | 395/611 |
| 5,774,888 A | 6/1998 | Light | ............................ | 707/1 |
| 5,778,363 A | 7/1998 | Light | ............................ | 707/5 |
| 5,794,209 A | 8/1998 | Agrawal et al. | .............. | 705/10 |
| 5,799,311 A | 8/1998 | Agrawal et al. | ............ | 707/102 |
| 5,808,615 A | 9/1998 | Hill et al. | ................... | 345/356 |
| 5,819,273 A | 10/1998 | Vora et al. | .................... | 707/10 |
| 5,841,437 A | 11/1998 | Fishkin et al. | .............. | 345/346 |
| 5,850,531 A | 12/1998 | Cox et al. | | |
| 5,918,217 A | 6/1999 | Maggioncalda et al. | ...... | 705/36 |
| 5,950,216 A * | 9/1999 | Amro et al. | ................ | 715/515 |
| 6,012,051 A | 1/2000 | Sammon, Jr. et al. | ........ | 706/52 |
| 6,070,176 A | 5/2000 | Downs et al. | .............. | 707/513 |
| 6,119,108 A | 9/2000 | Holmes et al. | ............... | 705/40 |
| 6,138,107 A | 10/2000 | Elgamal | ...................... | 705/39 |
| 6,463,431 B1 * | 10/2002 | Schmitt | ......................... | 707/5 |
| 6,526,232 B1 * | 2/2003 | Mizumura | ................... | 396/72 |
| 6,556,210 B1 * | 4/2003 | Yamamoto et al. | ......... | 345/582 |
| 6,842,176 B2 * | 1/2005 | Sang'udi et al. | ............ | 345/440 |

OTHER PUBLICATIONS

Williamson et al, "The Dynamic HomeFinder: Evaluating Dynamic Queries in a Real-Estate Information Exploration System", ACM 1992, pp. 338-346.*

Hudson et al, "Automatic Generation of Starfield Displays Using Constraints", ACM 1995, pp. 202-203.*

Jain et al, "Data Structures for Dynamic Queries: An Analytical and Experimental Evaluation", ACM 1994, pp. 1-11.*

Hibino et al, "User Interface Evaluation of a Direct Manipulation Temporal Visual Query Language", ACM 1997, pp. 99-107.*

Keim et al, "Visual Feedback in Querying Large Databases", IEEE 1993, pp. 158-165.*

Hibino et al, "Processing Incremental Multidimensional Range Queries in a Direct Manipulation Visual Query Environment", Data Engineering, 1998, Proceedings., 14th International Conference on, Feb. 23-27, 1998, pp. 458-465.*

"Exploring Terra Incognita in the Design Space of Query Devices," C. Ahlberg & S. Truve, Proceedings of the IFIP TC2/WG2.7 Working Conference on Engineering for Human Interaction, p. 49-68, Aug. 1, 1995.

"The Alphaslider: A Compact and Rapid Selector," C. Ahlberg & B. Schneiderman, Proceedings, ACM SIGCHI '94, Human Factors in Computing Systems p. 365-371.

"Dynamic Queries for Information Exploration: An Implementation and Evaluation," C. Ahlberg, C. Williamson & B. Schneiderman, Proceedings ACM CHI '92:Human Factors in Computing Systems, p. 619-626.

"IVEE: An Environment for Automatic Creation of Dynamic Queries Application," C. Ahlberg & E. Wistrand, Conference companion on human factors in computing systems, p. 15-16, May 7-11, 1995, Denver, Colorado, United States.

"IVEE: An Information Visualization & Exploration Environment," C. Ahlberg & E. Wistrand, Proceedings of the 1995 IEEE Symposium on Information Visualization, p. 66, Oct. 30-31, 1995, Atlanta, Georgia.

"Visual Information Seeking: Tight Coupling of Dynamic Query Filters with Starfield Displays," C. Ablberg & B. Shneiderman, Proceedings ACM CHI94-Apr. 1994 Human Factors in Computing Systems, p. 313-317, Apr. 24-28, 1994 (with color plates).

* cited by examiner

DATA ANALYSIS SYSTEM WITH AUTOMATED QUERY AND VISUALIZATION ENVIRONMENT SETUP

CROSS-REFERENCE TO RELATED APPLICATIONS

This application is a continuation-in-part of U.S. patent application Ser. No. 09/479,194, filed Jan. 7, 2000, now abandoned, which is a continuation-in-part of U.S. patent application Ser. No. 08/850,828, filed May 2, 1997, now U.S. Pat. No. 6,014,661, which claims priority from U.S. provisional application Ser. No. 60/019,049 filed on May 6, 1996.

FIELD OF THE INVENTION

This invention relates to a method and system for retrieving data, for example from a data base, and for allowing a user to selectively view the data based on interactive queries. This invention also relates to a control mechanism in a graphical user interface, in particular, to a method for specifying values in displayed icons.

DESCRIPTION OF THE RELATED ART

Part I

At present, when a user wishes to analyze the data in a data base, he faces the tedious task of entering a series of search parameters via a screen of input parameters. At times, the various queries must be linked using Boolean operators, and changing one parameter or operator may often necessitate changing many other less crucial parameters so as to keep them within the logical range of the input data set. Similar difficulties are now also arising when a user or a search engine scans many Internet sites to match certain criteria.

Furthermore, the concept of "analyzing" the data in a data base usually entails determining and examining the strength of relationships between one or more independent data characteristics and the remaining characteristics. This, in turn, leads to an additional difficulty—one must decide what is meant by the "strength" of a relationship how to go about measuring this strength. Often, however, the user does not or cannot know in advance what the best measure is.

One common measure of relational strength is statistical correlation as determined using linear regression techniques. This relieves the user of the responsibility for deciding on a measure, but it also restricts the usefulness of the analysis to data that happens to fit the assumptions inherent in the linear regression technique itself. The relational information provided by linear regression is, for example, often worse than useless for a bi-modal distribution (for example, with many data points at the "high" and "low" ends of a scale, but with few in the "middle") since any relationship indicated will not be valid and may mislead the user.

What is needed is a system that can take an input data set, select suitable (but user-changeable), software-generated query devices, and display the data in a way that allows the user to easily see and interactively explore potential relationships within the data set. The query system should also be dynamic such that it allows a user to select a parameter or data characteristic of interest and then automatically determines the relationship of the selected parameter with the remaining parameters. Moreover, the system should automatically adjusts the display so that the data is presented logically consistently. This invention makes this possible.

Part II

The graphical user interface (GUI) has revolutionized computing. Rather than having to learn a large set of commands and key patterns, GUI users can quickly launch applications, scroll between pages, change fonts, enter data base queries, and perform many other previously tedious tasks by simply moving a mouse or similar input device in order to maneuver an on-screen cursor and "clicking" on or dragging a selector displayed on a monitor. Selectors include simple check boxes, scroll bars and buttons, icons (such as an image of a small printer to execute a "Print" command), pointers, etc.

Often, however, existing selectors can themselves be too much of a good thing. By reducing the need for the keyboard, GUI designers have also often made it more dificult, even for the most dexterous using the most sensitive mouse, trackball, touchpad, touchscreen, etc., to precisely position the selectors and enter exact values. This dificulty is of course amplified for those who are not as nimble, or who use input devices such as small touchpads on portable computers that are less precise to begin with. For example, the most commonly used word-processing applications display a graphically movable button on a scrollbar as a way for the user to select which page (or portion of a page) of a document is displayed. If the user is currently viewing, say, page 3, and wants to see page 6 instead, then he positions the cursor on the button and drags it downward until page 6 is displayed.

The problem is that if the document is large, then a slight movement of the mouse, and thus cursor, can cause a large jump in which page is displayed. The conventional solution to this is for the user to enter the desired page number in a field in a window that he must open by clicking through one or more layers of a toolbar or pull down menu. When using Microsof@ Word 97, for example, selecting a specific page to scroll to in this way requires the user to re-position the cursor four separate times (to the "Edit" menu, to the "Go To" menu item, to the "Enter page number" field, and to the "Go To" button icon), with three clicks and one keyboard entry of the desired page number.

The process can be shortened by using the "hot key" combination "Ctrl+G," but even this involves (for most users), releasing the mouse to reach the "G" key with the right hand while holding down the "Ctrl" key with the left, then once again reaching for the mouse to position (and click) the cursor in the "Enter page number" field, entering the desired page number, then moving the cursor to the "Go To" button and clicking once again. Even this "shortcut" therefore requires one simultaneous, double keyboard entry (Ctrl+G), one keyboard data entry (the page number), and two repositionings of the cursor.

The need to make it easier for users to adjust graphical range and value selectors arises in may other applications than word-processing; indeed, some other applications may be even more demanding. For example, there are many applications that visualize relationships between different data sets and allow users to manipulate the display of database analyses. In these applications, display devices—sometimes referred to as "graphical query devices"—translate cursor movements into search queries, for example, expressed in the common SQL language.

Thus, rather than having to enter the value "123.4" as a range limit into some portion of a command line, the user can simply maneuver his mouse and thus a screen cursor to drag a displayed range slider device until the edge of the slider aligns with the desired value, which is indicated on a scale or in a call-out displayed next to the slider. In these applications, there will typically be an even larger range of more finely subdivided possible values than there are pages in a typical document, which means that it is even more difficult—and therefore also slower—for a user to position the cursor and drag the displayed input device just right.

A similar operation is required to adjust other parameters using graphical input devices. For example, many applications, including data visualization programs and image editing applications, have a graphical device that allows the user to change a zoom level of a display.

What is needed is a way for users to be able to enter desired values in the context of a graphical user interface that requires fewer steps and less hand motion, that relies less on the precision of the mechanical input device than do existing GUI's, and that is more accurate. At the same time, users should not be required to adjust to using an unfamiliar graphical input device; rather, preferably, the full, familiar functionality of the input mechanism should still be available to the user. This invention provides such an input mechanism.

SUMMARY OF THE INVENTION

Part I

The invention provides a system and method for processing and visualizing data from a data base, in which the data base contains a plurality of records, each record includes a plurality of data fields, and each field has field data, a field name, and one of a plurality of data types. First, the main processing system according to the invention accesses the data base and reads in the records. For large data bases, in order to reduce processing time, the system may alternatively sample the records before proceeding with general evaluation.

In a preferred embodiment of the invention, one or more relevance measures are then selected and the system automatically detects a relational structure between the fields by calculating the relevance measure for each of the fields. Selected ones of the fields are then displayed in an order determined as a predetermined function of their respective relevance measures. The user may choose a different relevance measure from among the selected ones as the basis for the display. The system then selects a display format (for example, X-Y plot, pie chart, etc.) and displays at least one of the fields' data for the user. In the preferred embodiment, the relationship between at least two of the fields is displayed, with one field forming a base or primary field and the other field(s) forming secondary field(s). The user may also change the display format, scaling, and selection of displayed fields.

In a preferred embodiment of the invention, the system automatically detects the data type of each field, as well as a data range for each field, by evaluating the corresponding field data over a plurality of the data records. For each field, the system then automatically selects one of a predetermined set of display query devices as a predetermined function of the corresponding data type and data range. The system then displays to the user the corresponding display query devices for each field, with displayed range markings corresponding to the data range of the field. The displayed query device is preferably user-adjustable over the displayed range markings, with the display being adjusted according to the current range settings of each field's query device.

Part II

The invention provides a method and system for inputting at least one parameter into a computer. For at least one input parameter, for example, a query parameter in a database analysis routine, at least one associated primary graphical input device is displayed on a display. The system senses user selection of the primary graphical input device, which has a state that corresponds to a value of the respective input parameter and is graphically controllable by a user via at least one predetermined primary input action.

Associated with the primary graphical input device is at least one predetermined non-graphical, secondary input action that corresponds to secondary input by the user of the value of the respective input parameter. While the primary graphical input device is selected, the system senses any of the primary as well as any of the secondary input actions of the user; interprets the sensed input action of the user as input data; and sets the value of the input parameter to correspond to the input data.

In the preferred embodiment of the invention, a secondary graphical input device is generated on the display upon sensing user initiation of any secondary input action. Data entered by the user as the secondary input action is displayed within the secondary graphical input device.

Where a plurality of parameters to be adjusted, the values of the plurality of parameters are preferably associated with positions of a corresponding plurality of adjustable displayed portions of a single primary graphical input device. A respective activation region of the primary graphical input device is then preferably associated with each displayed portion. When the user selects one of the activation regions, and upon user initiation of a secondary input action, the system sets the value of the parameter associated with the selected activation region equal to data entered by the user.

A single activation region of the primary graphical input device may also be associated with a plurality of the parameters. When the system senses that the user has selected the activation region, it also senses entry by the user of a plurality of input values via secondary input action. The system then sets the values of the respective parameters according to the input values.

In one embodiment of the invention, a number of values input by the user into the secondary graphical input device is compared with the number of parameters associated with corresponding displayed portion of the primary graphical input device. If the number of values input is greater than the number of parameters, then an adjustable displayed portion of the primary graphical input device is subdividing into a number of displayed adjustable portions corresponding to the number of values input; if the number of values input is less than the number of parameters, then corresponding ones of the adjustable displayed portions are joined.

One example of a primary graphical input device is a page-selection scroll bar of a word-processing program. In this case, the parameter will in many implementations be a page number.

In several embodiments of the invention, the input data and input parameter are alphanumeric strings.

One example of how primary user input actions are performed is by maneuvering a cursor-control device such as a mouse or trackball. Secondary user input actions may then be performed using an alphanumeric input device such as a keyboard. The user may then select the primary graphical input device by maneuvering a non-alphanumeric, cursor-control device to position an on-screen cursor on the primary graphical input device; the user then performs the primary input actions using the non-alphanumeric, cursor-control device and the secondary input actions using an alphanumeric input device.

DETAILED DESCRIPTION

Part I

The invention is well suited for interactive visualization and analysis of data from any type of data base. Just a few of the thousands of possible uses of the invention are the visualization and analysis of financial data, marketing data, demographic data, experimental data, environmental data, logistics data, World-Wide Web log files, manufacturing data, biostatistics, geographic data, and telephone traffic/usage data.

Figure 1:
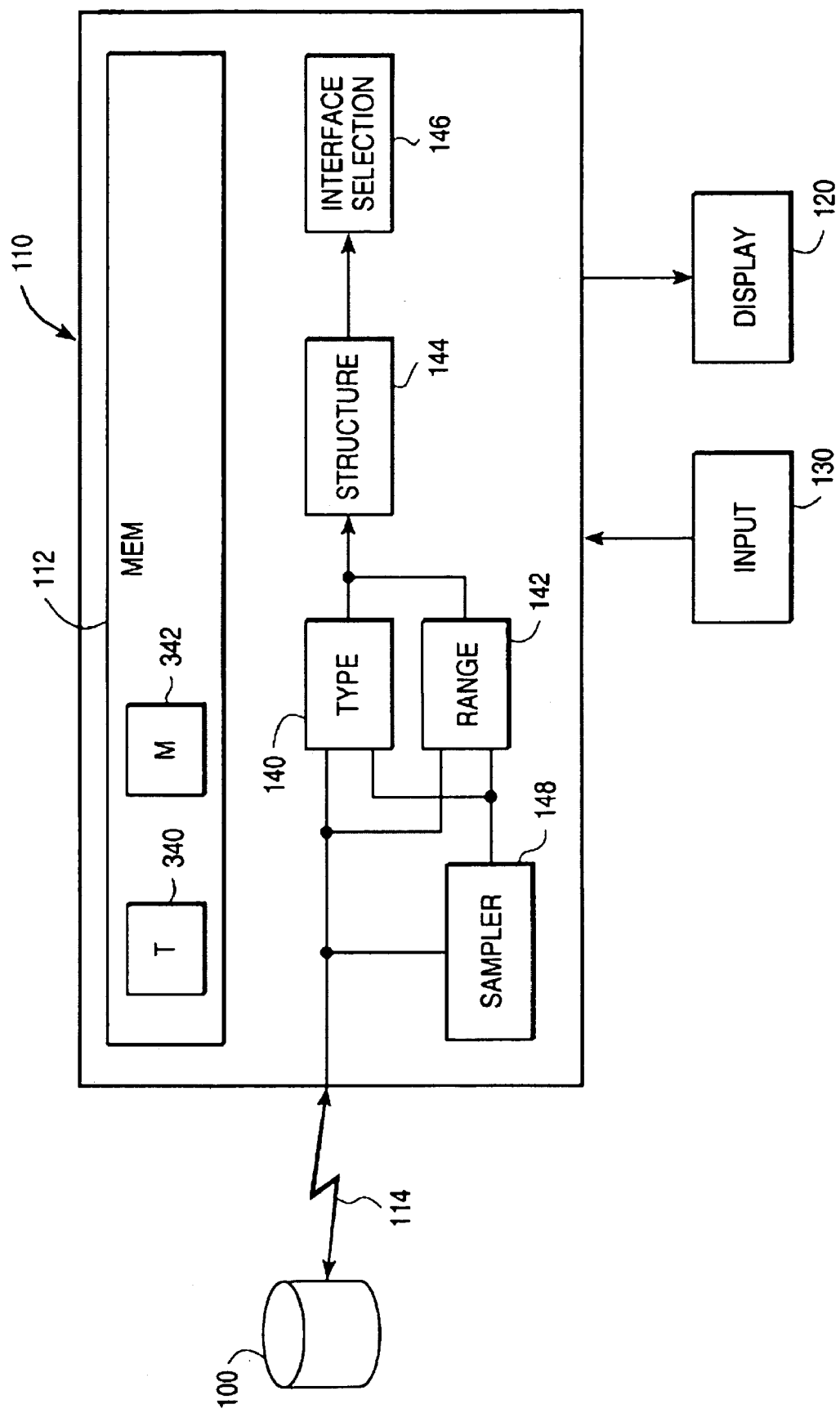
FIG. 1 illustrates the main components of a system according to the invention for retrieving and displaying data from a data base.

The main components of the system according to the invention are illustrated in FIG. 1. A data base or data set 100 may be stored in any conventional devices such as magnetic or optical disks or tapes and semi-conductor memory devices. The size of the data set may be arbitrary, as the invention has no inherent limitations in the size of the data base it can process.

A main processing system 110 may be implemented using a microprocessor, a mini- or mainframe computer, or even a plurality of such processors operating in parallel or as a pipeline. The processing configuration may be chosen using normal design techniques based on the size of the largest data set one expects to have to process, and on the required processing times. The processing system 110 includes, among other sub-systems, a sufficiently large memory 112 to store all data used in the data classification and display procedures described below.

The data set 100 (that is, its storage device) is connected for communication with the main processing system by means of any conventional channel 114, which may be a dedicated channel, or a general-purpose channel such as telephone lines (for example, for connection through a network, including the Internet), fiber-optic or high-bandwidth metal cables, or radio or micro-wave links. The size of the data set and the desired processing speed will in general determine which channel is appropriate and fast enough. The data set need not be remote from the processing system; rather, the data set's storage device 100 may even be a peripheral memory device connected directly to the processing system 110.

In most applications of the invention, the user will wish to see a graphical display of some feature of the data set. This is not, however, necessary—the invention may be used as a sub-system that queries the data base 100 and organizes the data for a supervisory routine, which then processes the data automatically in some other way. For example, the invention may be used in a system that automatically generates lists of potential customers of a product chosen from a large data base of consumer information. In the typical case, however, the results of the data processing using the invention are to be interactively displayed and to that end, a display unit 120 is preferably connected to the main processing system 110. The display unit may be a standard device such as a computer monitor or other CRT, LCD, plasma or other display screen. Standard display drivers (not shown) are included in the display unit 120 and are connected to the processing system 110 in any conventional manner.

A conventional input system 130 is also connected to the main processing system in the normal case in which the user is to select initial data classification parameters. The input system may consist of a single standard positional input device such as a mouse or a trackball, or an alphanumeric input device such as a keyboard, but will normally include both types of devices. The display unit 120 itself may also form part of the input device 130 by providing it with standard touch-screen technology. The connection and interface circuitry between the input system 130 and display unit 120 on the one hand and the processing system 110 on the other hand may be implemented using standard components and is therefore not described further here.

The main procedural steps carried out by the invention are as follows:

1) The main processing system 110 accesses the data base 100 in any known manner and exchanges standard protocol information. This information will normally include data indicating the size of the stored data set as well as its record and field structure.

2) The processing system then downloads records and classifies them by type (also known as attribute). Some examples of the many different possible types of data include integers, floating-point numbers, alphanumeric characters, and special characters or codes, lists and strings, Boolean codes, times and dates, and so on. In a data base of films, for example, each record may have data concerning the title and the director's name (alphanumeric attribute), the release year (an integer), whether the film is a comedy, drama, documentary, action film, science fiction, etc. (marked in the data base as an integer or alphanumeric code), whether the film won an Academy Award (logical) or how many it won (integer). As is described in greater detail below, the system according to the invention preferably automatically type-classifies the various fields in the data base records. In certain cases, however, the data base itself (in the initial protocol and structural information) may also indicate the types of the various fields of the records; in such case, the processing system may not need to type-classify the fields and can omit this step.

3) For each record set that the processor has classified, it then (or simultaneously) determines the range of the data for each field in the set. This can be done in any of several standard ways, and different methods may be used for different data types. For numerical data sets, the system may simply search through the set to determine the maximum and minimum values as well as (if needed), the average or median values to aid in later centering and scaling of a corresponding displayed query device. The system preferably also counts the number of different values in each set of fields in all of the records in the data set. Ranges may also be predetermined; for example, if the user wishes to include in the data base search data records sorted alphabetically by surnames of Americans or Britons, then the range of first letters will be no greater than A–Z (a range count of 26), although a search of the actual records in the data base might show that the range of, say, A–W is sufficient (with a range count of 23). For names (or other text) in other languages, the alphabetical range and range count may be either greater or smaller; for example, Swedish text could begin on any of 29 different letters (A–Z, .ANG.,A,O).

4) The system then analyzes the relational structure of the data records using any or all of a plurality of methods. These methods include regression, decision trees, neural networks, fuzzy logic, and so on. According to the invention, the system preferably applies more than one method to determine the structure of the data and then either selects the "best" method in some predetermined sense, or else it presents the results of the different structural determinations to the user, who then may then select one that appears to give the best result.

5) Once the system has determined the data field types and ranges, the system determines a user interface to be displayed on the display unit 120. The results of the structural relational analysis are also preferably used to order the various query devices that are displayed to the user to give him guidance in finding the strongest relationships among the various fields of the data base. The interface preferably automatically selects (at least initially—later, the system automatically presents alternatives to the user, from which he may select) the lay-out of query devices (described below), coordinate axes (either automatically or under user control) and scales, display colors and shapes, the degree of "zoom" of the display (if needed), or other features depending on the particular application and user preferences.

6) In many cases, there will be so many records in the data base that it would take too long for the system to search through all records in the data base to determine the record type or range. The invention therefore preferably includes the procedural step of sampling the data set to determine the record type and to extrapolate its range from the range of the sample. Different sampling techniques may be used. For example, every n'th record can be examined (where n is determined by what percentage of the records the system can examine in a given time); or a predetermined percentage of the records can be selected randomly; or records may be sampled randomly until a predetermined statistical significance has been achieved, etc. Once the sampling process has been completed, the entire data set can be downloaded and processed for display using the type and range classifications of the sample.

As FIG. 1 illustrates, the steps of type detection, range determination, structure identification, interface selection and sampling may be carried out in dedicated processing sub-systems 140, 142, 144, 146 and 148, respectively. Note that many of the processing steps described above (for example, type/range determination and interface selection) can be carried out in parallel as well as in series. Assuming the chosen processing configuration is fast enough, however, all of these steps, or any combination of steps, may be carried out by the same processor.

In most conventional systems, data base searches are interactive only in the sense that the user's initial "guess" (search profile) can be modified and re-submitted—the user is given little or no guidance or indication of the size and range of the data involved in the various possible choices for the search profile. As such, the user might, for example, initially submit a search profile with no possible "matches." By initially analyzing the data set to determine data types (attributes) and ranges, the invention is able to create an initial query environment that allows the user to avoid such wastes of time. Even further time-saving procedures unique to the invention are described below.

Figure 2:
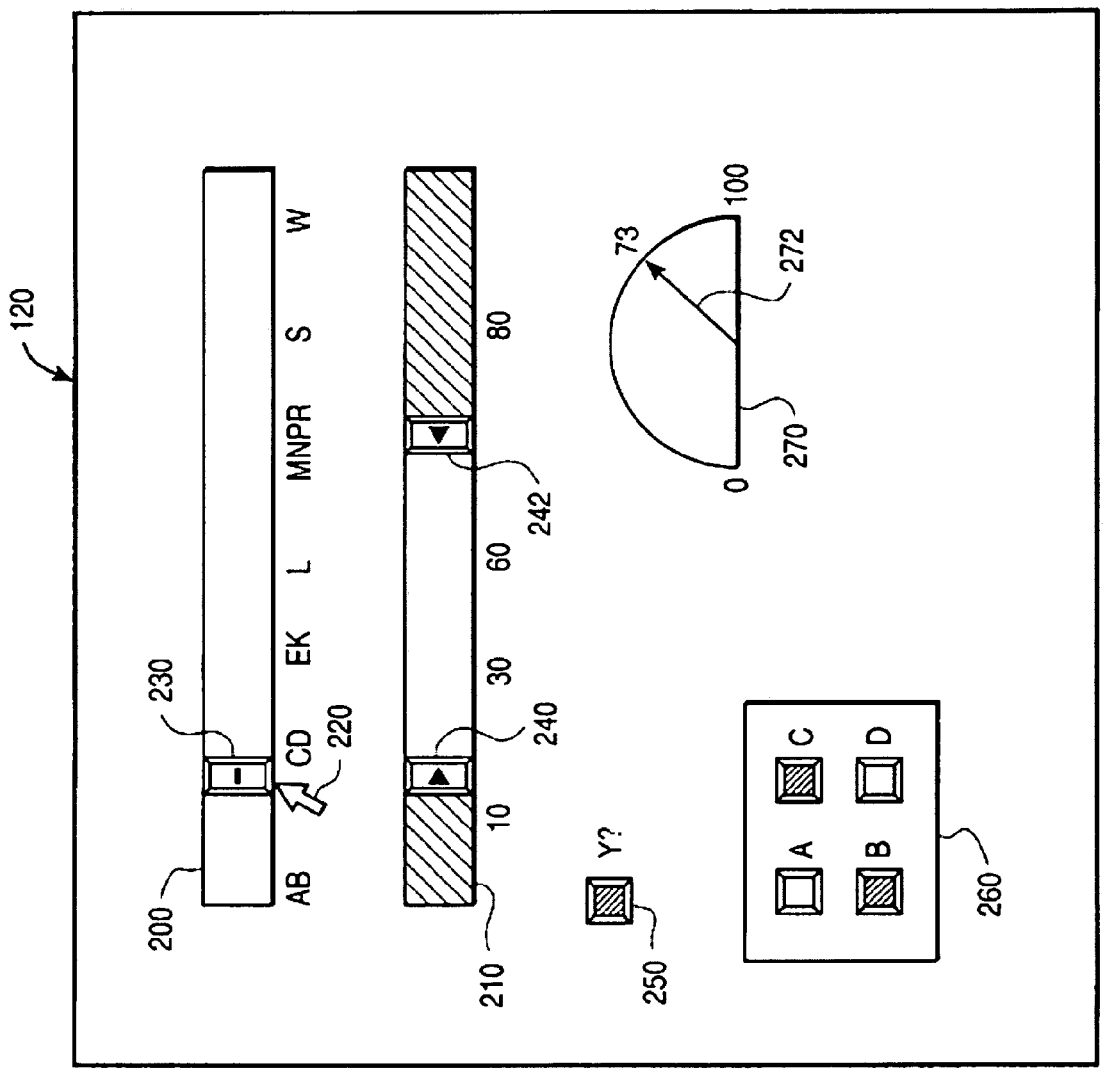
FIG. 2 illustrates examples of device queries that can be used in the invention's interactive display.

FIG. 2 illustrates examples of dynamic query devices that the processing system may generate on the screen of the display unit 120, depending on the type and range of the data. The various data query devices are generated and located for display using any known software, such as is readily available for writing display software for Microsoft Windows applications or similar software packages. One of the most useful query devices is the slider, which may be either a single-slider query device 200 for indicating single alphabetical or numerical characters, or the rangeslider query device 210 for indicating ranges of alphabetical or numerical characters; two-dimensional single and range sliders may also be used.

In FIG. 2, the attribute of the data field associated with the single slider 230 is alphabetical. One sees in this example that the data in the indicated field has relatively very few "A" entries, relatively many "B" entries, few or possibly no "j" entries, many "S" entries, and so on. The user can also see that there are no "X", "Y", or "Z" entries—the upper alphabetical limit "W" will have been determined during the range detection step. In the illustrated example, the user has manipulated a standard screen cursor 220 (for example, using a trackball or mouse included in the input system 130) to move the slider 230 approximately to the right-most range of the "B" entries. In other words, the user is requesting the system to find data records for which the corresponding data set records start with a "B".

The "scale" of the alphaslider need not be alphabetical; rather, instead of the letters "A", "B", . . . , "W" and so on, the system could display numbers, one of which the user is to select by "touching" and moving the slider 230. The user may move the slider 230, for example, by placing the tip of the cursor 220 on it and holding down a standard mouse button while moving the mouse to the left or right, releasing the button when the slider is at the desired value.

The illustrated range slider query device 210 has a scale the same as the single-valued slider, but, as its name indicates, is used to select a range of values. To do so, the user "touches" either the left range slider 240 or the right range slider 242 and moves it as with the slider 230. In the illustrated example, the user has selected a query such that only those relations should be displayed for which the chosen attribute has a value between about 13 and about 72. Excluded values are here displayed "shaded" on the slider query device.

Many variations of the illustrated sliders may be used in the invention, such as those that indicate which values are not to be included (for example, by "clicking" on an appropriate portion of the slider display to indicate by shading that the logical complement of that portion of the range is to be applied), that indicate ranges inclusive at one extreme but exclusive at the other (for example, by clicking on the range marker to toggle it to different logical states), and so on. A more complete discussion of the possibilities is given in the inventors' papers "Exploring Terra Incognita in the Design Space of Query Devices," C. Ahlberg & S Truve, Dept. of Computer Science and SSKKII, Chalmers University of Technology, Goteborg, Sweden, which is attached as appendix A; the article "The Alphaslider: A Compact and Rapid Selector," C. Ahlberg & B. Schneiderman, Proceedings, ACM SIGCHI '94, Apr. 24–8, 1994, which is attached as appendix B; and "Dynamic Queries for Information Exploration: An Implementation and Evaluation," ACM SIGCHI '92, May 3–7, 1992, which is attached as appendix C.

The illustrated example also shows a toggle 250 on which the user has "clicked" (for example, in the standard way, by "touching" the toggle with the cursor on the display screen and pressing a mouse button) to indicate that the feature "Y" should be present in the displayed data. That the toggle is "on" may, for example, be indicated by the processing system by displaying it darker, by superimposing a cross ("X") on it, or in some other conventional way.

A checkbox 260 contains more than one toggle. In the illustrated example, features B and C have been selected for inclusion as a data query, whereas A and B have not. A displayed dial 270 is yet another example of a query device. Using the cursor, the user pulls the pointer 272 clockwise or counter-clockwise and the system displays the value (in the example, "73") to which the pointer is currently pointing. Other query devices may be used, for example, pull-down menus and two-dimensional sliders (for example, one on an x-axis and another on a y-axis).

Figure 3:
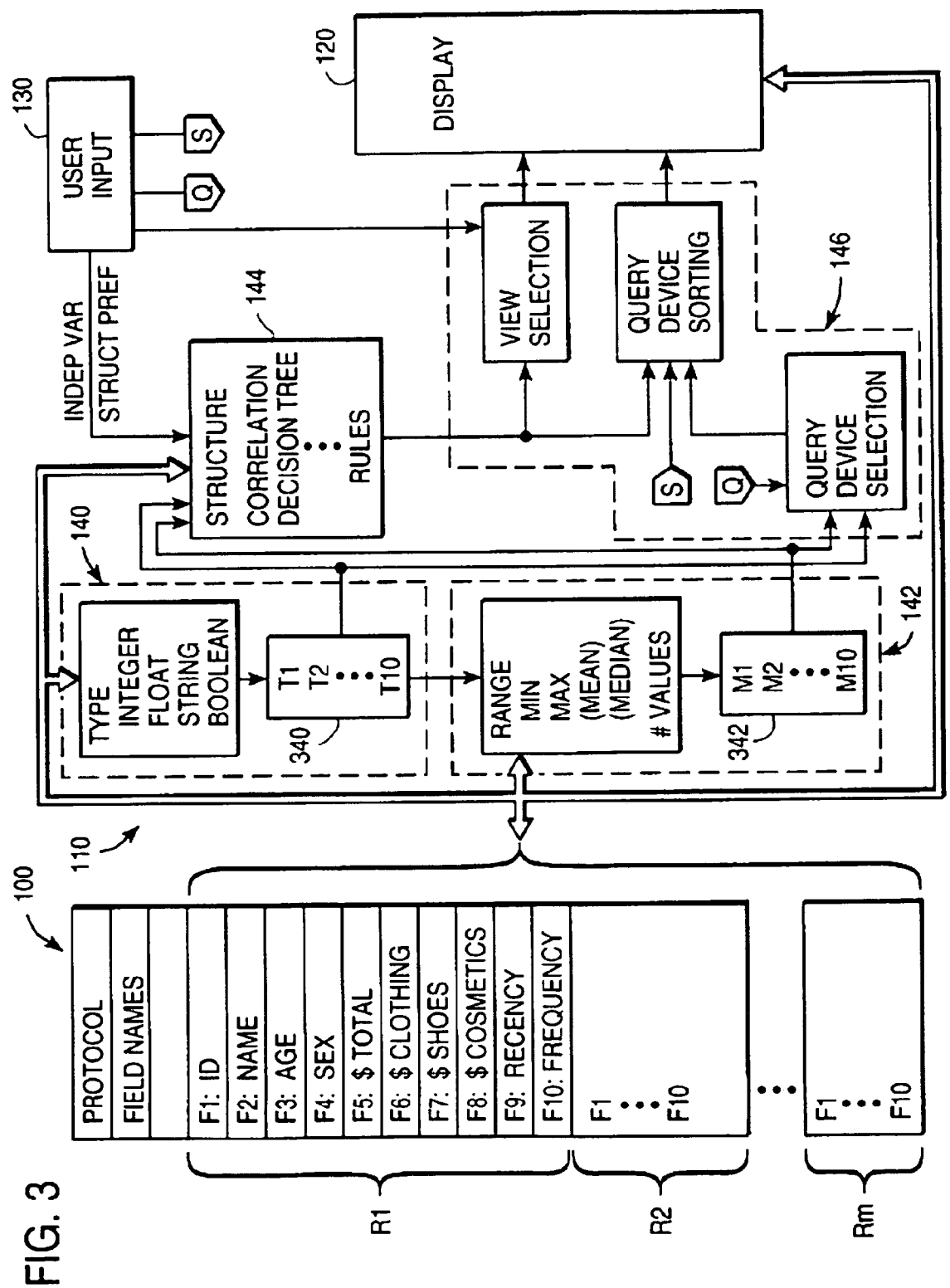
FIG. 3 illustrates the main processing steps the invention follows for one example of the use of the invention to visualize relationships between data in a data base.

FIG. 3 is a block diagram that shows not only the main paths of data flow in the invention, but also is a more detailed functional block diagram of the system shown in FIG. 1. Reference numbers for the functional blocks are the same as those in FIG. 1. Furthermore, the sampling sub-system 148 has been omitted from FIG. 3 since its operation is described above and since it will simply reduce the number of data records initially passed on to the type detection, range detection and possibly the structure detection sub-systems described below.

As is mentioned above, the invention can be used for many different types of data bases and data base structures. Merely by way of example, however, assume that the user wishes to analyze the possible relationships found between various items in a data base of customer purchases for a chain of stores that sell clothing, shoes, and cosmetics. Such data might be compiled automatically, for example, for all customers who use the store's own credit card. This situation is illustrated in FIG. 3.

As is common, the data base 100 is organized as a series of records R1, R2 . . . , Rm, each of which has a number of fields F1, F2, . . . , Fn. In this example, there are ten fields per record (here, n=10 but the number of fields per record in actual data bases may of course be greater or less than ten—the invention is not dependent on any particular number of records or fields). The fields (F1, F2, . . . F10) in the example are: F1) an identification code for the customer associated with the record; F2), F3) and F4) the customer's name, age and sex, respectively; F5) the total amount the customer has spent (during some predetermined period); F6), F7), and F8) the amount the customer has spent on clothing, shoes and food, respectively, during this period; F9) the date of the customer's most recent purchase; and F10) a number representing how frequently the customer makes purchases (for example, measured in transactions per month).

The illustrated data base also includes standard protocol data as well as field names associated with the different fields. The protocol data will typically include data indicating the total number of bytes (or words) the data base contains, how many records, how many fields per record, and how many bytes (or words) each field consists of. If the protocol is already standardized or otherwise predetermined between the data base 100 and the main processing system, then there will be no need for the protocol fields. Moreover, the field name data will not be necessary if it is already established in some other conventional manner for the user or the main processing system of the invention what data the various record fields represent.

In the preferred embodiment of the invention, the main processing system 110 automatically detects the type of data in each of the record fields, unless the data types are already specified by the data base in the protocol or field names data. This may be accomplished using any known data type detection routine, as long as the number of records in the data base is large enough to allow the detection routine to make statistically relevant deductions about the data. For example, in order to detect the type of data in field Fk (k=1, 2, . . . m), the processing system may access (that is, download in bulk, read in and process sequentially, etc.) all of the field data (R1, Fk), (R2, Fk), . . . , (Rm, Fk), where (Rj, Fk) indicates the k'th field of the j'th record. Any of many different known tests may then be applied to determine the data type.

For example, if all (or more than a pre-defined percentage) of the bytes of all of the fields Fi (that is, field Fi in all of the records) correspond to binary numbers from 97–122 and 65–90, then the system may assume the field contains data with an alphabetical (string) attribute (type), since these are the ranges of the ASCII codes for the English-language alphabet (upper and lower case, respectively). In the example shown in FIG. 3, this would be the case for F2: Name. If only two different values are detected (especially, 00000000 and 00000001), then the system may, for example, assume that the corresponding field contains Boolean data or; if the two values also fall within the ASCII alphabetical range, then the system may instead (or, temporarily, in addition) mark the field as an alphabetical field. Field F4 might thus be either Boolean (if the Field name is "Woman?" then F4 might indicate either "yes" or "no" with binary numbers 1 and 0) or a single-element string alphabetical ("F" for female, "M" for male). Using known methods, the system will similarly distinguish between integers and floating-point numbers, often by a knowledge of the field structure itself from the protocol data—integers are typically represented by single data words, whereas floating point numbers will typically require two separate data words for the whole-number and decimal portions. Indications of the data types are then preferably stored in the memory 112 as a data type table 340 in the memory 112. In FIG. 3, field Fk has been identified as having data type Tk, (k=1, 2, . . . , n).

For each field, the range detection sub-system 142 determines upper and lower limits. For numerical fields, for example, this will typically be the maximum and minimum values. For string data, however, this will typically be the letters closest to either end of the alphabet. The number of different values is preferably also accumulated for each field.

Additional data may also be tabulated as desired or needed. For string data, for example, for each string field, the system might accumulate a separate table of the number of times each letter of the alphabet occurs first in the field in order to reduce clutter in the later display by eliminating non-occurring letters. The median of the occurrence table may then be calculated and used for later centering of the scale of the associated query device (see below). For numerical fields, the range detector 142 may additionally calculate such statistical range data as the mean, median, and standard deviation of the field data. All calculated range data is then preferably stored in a data range table 342 in the memory 112. In FIG. 3, field Fk has been identified as having range data Mk, (k=1, 2, . . . , n).

As is mentioned above, the type- and range-detection sub-systems 140, 142 may operate either in series or in parallel. Even with a single processor implementing both sub-systems, these two sub-systems may operate "simultaneously" in the sense that each operates on a single data value before the next is processed, in order to reduce processing time by having only a single download of the data. For example, the range detector 142 may use each accessed data word as soon as the type detector is finished with it and then use it in the on-going, cumulative calculations of minima, maxima, means, and all other range data for the corresponding field. Once the type detector determines the data type for each field, the range detector can then discard range data calculations that are inappropriate to the detected type. For example, in general there will be no need for a calculation of the median or mean of Boolean or entire strings of data (although, as is mentioned above, there may be for first letters).

Once the type and range of the fields have been determined, the system then automatically determines various relationships between the different data fields. Preferably, several different methods are used, from which the system initially selects a "best" method in a predetermined sense, and also orders query devices in such a way on the display that they indicate to the user which relationships are the strongest. In some applications, the user knows which data characteristic (data field) the relationship determination is to be based on. For example, the user might wonder which type of purchase (clothing, shoes, or cosmetics) seems to be most highly dependent on the age of the customers. In such cases, the user will indicate this to the processing system by entering the independent variable—in the assumed example, "age"—via the input system 130. (The processing system may, for example, display a list of the field names on the display, from which the user can select in any standard way.) The preferred embodiment of the invention is not restricted, however, to beforehand knowledge of which data field is to be the independent variable in order to determine the structure of the data set, although this will in general reduce processing time and memory requirements.

One method of determining the structure of the data set is statistical correlation, either directly, using standard formulas, or in conjunction with determining the regression (especially linear) parameters for any two selected fields of data. For each possible pair of different data fields, the system calculates the statistical correlation and stores the resulting correlation values in a correlation matrix in the memory. The system then identifies the maximum correlation value for each field taken in turn as the independent variable, and orders the remaining variables in order of decreasing correlation. Note that statistical correlation will in general be a meaningful measure only of the relationship between sets of quantitatively ordered data such as numerical field data.

Moreover, if the user indicates which of the m variables (that is, which of the m fields) is to be used as the independent variable before the system begins correlation calculations, then the system need only calculate and order the resulting (m−1) correlation values. If the user does not indicate the independent variable for this or any other structure-determining method, then the system may simply assume each variable to be independent in turn and then calculate correlations with all others; the greatest correlation found can then be presented initially to the user.

Figure 4:
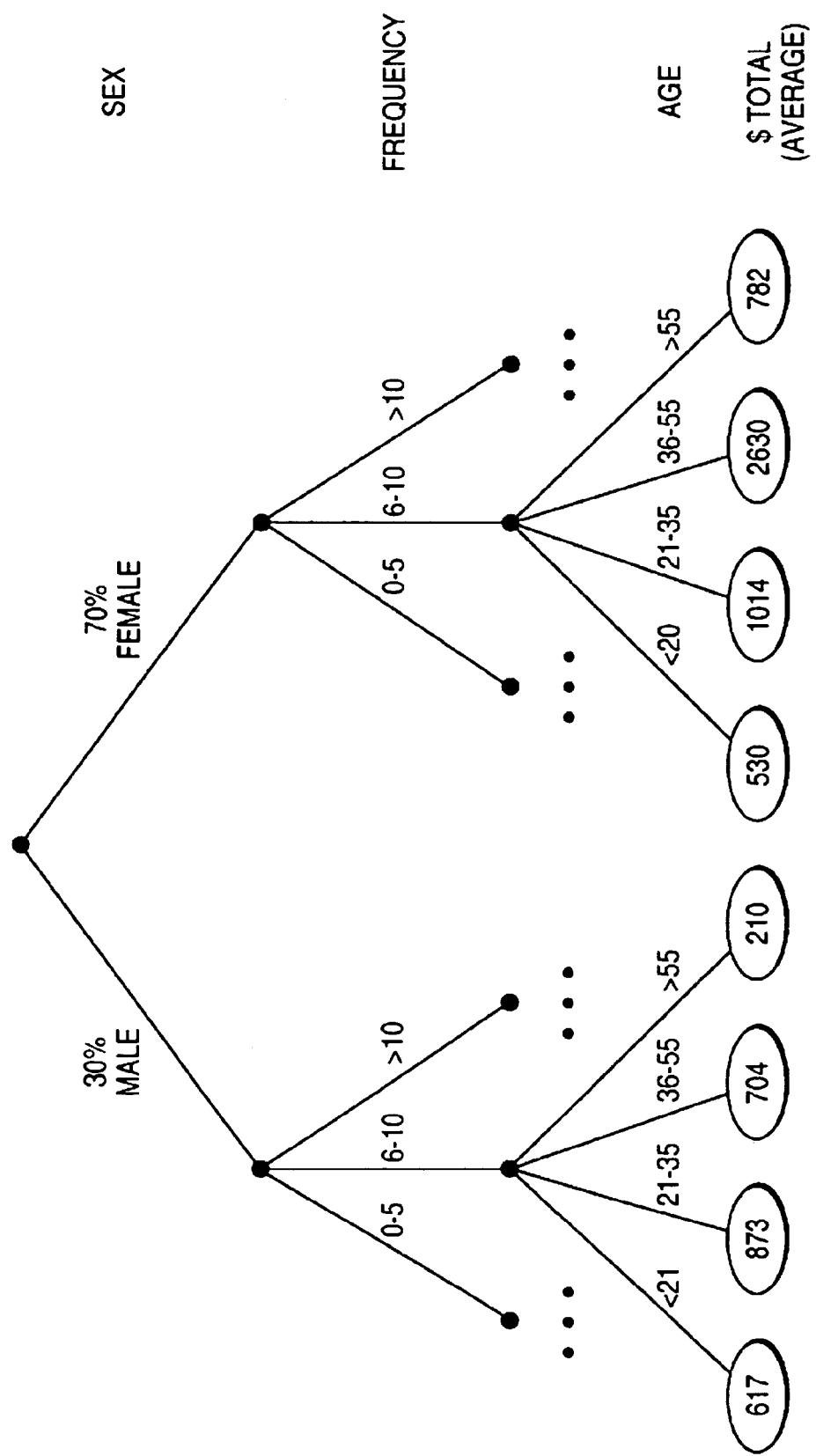
FIG. 4 illustrates a decision tree, which is one method that can be used in the invention to determine and define the structural relationship between different data fields in a data base.

Another method for determining structure is the decision tree, which can be constructed using known methods. See, for example, Data warehousing: strategies, technologies and techniques, Ron Mattison, McGraw Hill, 1996. As an example, consider FIG. 4, and assume that the independent variable of interest to the user is F5, that is, total spending. In the illustrated example, the structure sub-system determines that 30% of the data records are for men and 70% correspond to women. Note that this data will preferably already be available in the range data table under entries for number of occurrences of each state of each field. Note also that variable values may be defined as intervals, not only as individual values; thus, solely for the sake of simplicity of explanation, in the illustrated example, frequency data (field F10) is given as one of three intervals: 0–5,6–10, and more than ten purchases per time period, both for males and for females. For each frequency and for each sex, the data is further branched into age intervals: under 20, 21–35, 36–55, and over 55. (The decision tree will normally continue to branch further in order to include the possibilities for the other fields, but these have been deleted in order to simplify the discussion, with no loss of generality.) The total average spending for each branch is indicated at the tip of the lowermost branch (the independent variable). For example, the total average spending of the group of 36–55 year-old men who purchase 6–10 times per time period is $704.

Given the illustrated tree's ordering of branches, one can see that the highest level of average total spending is for 36–55 year-old women who purchase 6–10 times per period ($2630). By summing "upward" all branches at each level, the system can determine the total average purchases of all men/women whose frequency is 6–10, then for all men/women and then by traversing the tree "downward" the system can pick the path (order of variables) that gives the greatest total average spending, the next greatest, and so on. Note that the decision tree structure is not limited to numerically ordered fields.

In another, straightforward structural description of the data base the system compiles and inspects the distribution of distinct values (or number of values in a plurality of distinct intervals). This may be done either independently or in conjunction with the construction of, for example, a decision tree.

Yet another way to determine the structure of the data base is by using a neural network. The theory and construction of neural networks is well documented and understood and is therefore not discussed in detail here. Of note, however, is that neural networks must in general be "trained" to stabilize on known data sets before they can be used on "actual" data sets. In the context of this invention, the use of a neural network will thus normally depend on some beforehand knowledge of at least the type of data in the data base, so that a suitable set of training data can be compiled and used to train the network. Here, "suitable" means of the same general type, distribution, and with the same general data relationships as those actually presented to the processing system in later use. In many cases this will not be possible;

in others, however, it often is, for example, where the data base is numerical and dependent on an underlying set of substantially constant rules or natural laws such as meteorological data.

Assuming some other method is first applied to determine membership functions for the different variables (data fields), fuzzy logic techniques may also be used to measure the strength of relationships among pairs or groups of variables.

Other structure-determining methods include predictive rule-based techniques, which are described, along with still other methods, in Data warehousing: strategies, technologies and techniques, Ron Mattison, McGraw Hill, 1996.

Each different method for determining the structure of the data corresponds to a particular measure of what is meant by the "closeness" or "strength" of the relationship between two or more data fields. In many cases, only one of the different structure-determining methods in the sub-system 144 will be suitable for the detected data types. For example, statistical correlation may be the most suitable method if all of the data fields correspond to numerical data, whereas decision trees will normally be more efficient for ordering fields of strings or Boolean data. "Suitable" and "efficient" may be defined and calculated in any predetermined, known sense to determine a validity value indicating the validity of the corresponding measure. Furthermore, in many cases the methods themselves will reveal their own unsuitability. For example, if almost all data field pairs have statistical correlation near zero, then a different method, such as a decision tree, is almost certainly indicated.

Common to all the structure-determining techniques applied by the structure sub-system is that the sub-system determines a measure of relevance for each data field. In some cases, the relevance measure for a given field may be wholly independent of other fields. For example, one straightforward measure of relevance might be a count of how many fields have a certain value, or how many distinct values the field holds. This might be very relevant, for example, in evaluating the sales of some particular product, regardless of other sales.

In other cases, the measure of relevance may be a measure of dependence of some set of dependent, secondary variables (fields) on some base, independent variable (field) selected either automatically or by user input. One method for automatic selection would be to use as the independent field the same field ultimately selected by the user during a previous evaluation of the same or a similar data base or through user input. Another automatic method would be for the system to be connected to an existing expert system, which then selects the independent field. Yet another automatic method would be for the system to determine all possible pairs (or some predetermined or heuristically determined number of pairs) of fields, then evaluate the relevance measure for each pair, and then order all the results for user evaluation and selection. Statistical correlation (alone, or in conjunction with a linear regression or other curve-fitting routine) is one example of a measure of relevance that is based on a measure of dependence.

Once the system has calculated the relevance measure for each of the fields, then it preferably presents the results to the user by displaying the corresponding field names (or some other identifier) in order (for example, decreasing) of their relevance measures. Where the relevance measure involves dependence of secondary fields on a chosen base field, then the system preferably displays an indication of which field is the base field and in what order the other fields depend on it. The dependent variables are, for example, ordered in terms of decreasing dependence so that the user is given guidance as to which relationships may be of greatest interest. (As is described below, the user can change the order of presentation and the plotted, relationship-visualizing display.)

At any time after the system has determined the type and ranges of the various data fields, the system proceeds with query device selection. Consider once again FIG. 2. In the preferred embodiment of the invention, the initially presented query device will depend primarily on how many different possible values a data field can assume. The thresholds for selecting the different query devices will be predetermined and pre-programmed into the system, but can be changed under user control after initial presentation (for example, by activating a icon of the desired query device and then "dragging" it to the currently displayed query device, by activating and selecting from a pull-down menu adjacent to the currently displayed device, or by using any other known technique for changing portions of a graphical user interface). For example, if the data type if Boolean, a toggle may be predetermined to be the initial query device selected. For string and/or numerical data with fewer than, for example, seven different values, a checkbox or pull-down menu may be the default query device. For fields (variables) with more than some predetermined threshold number of different values, however, the default query device may be a single or range slider, depending on the data type.

More detailed discussion of query device selection is disclosed in the inventors' article (also mentioned above) "Exploring Terra Incognita in the Design Space of Query Devices," C. Ahlberg & S Truve, Dept. of Computer Science and SSKKII, Chalmers University of Technology, Goteborg, Sweden, which is attached as appendix A, which also discusses the scaling of sliders as a function of their range. For example, the lower limit of the data values may be placed at the left end of the slider scale, the upper limit at the right end, the different gradations or value marks (AB . . . CD . . . E . . . K . . . L . . . MNPR . . . S . . . W) can be displayed adjacent to the slider, and centered on the previously calculated median or average value.

The chosen query devices for the different data field variables are then preferably displayed on the display in the order of dependence on the chosen independent variable. The ordering used is, preferably, at least initially, as determined by the structure-detecting method that calculated the most significant dependence relationship in any pre-defined sense, that is, has the greatest validity value. For example, an indication of the name of the independent variable (that is, its field name) may be displayed in some prominent position on the display screen, and the other query devices are then preferably positioned top-to-bottom, left-to-right, or in some other intuitive way so as to indicate decreasing measured dependence on the independent variable.

Once the query devices are sorted and displayed, the system preferably also displays an initial plot (for example, X-Y, pie chart, bar graph, etc.) of the relationship. The initial type of plot, its scaling, color scheme, marker type, size, and other features—in short, the view selection—are preferably selected in any conventional manner.

Figure 5:
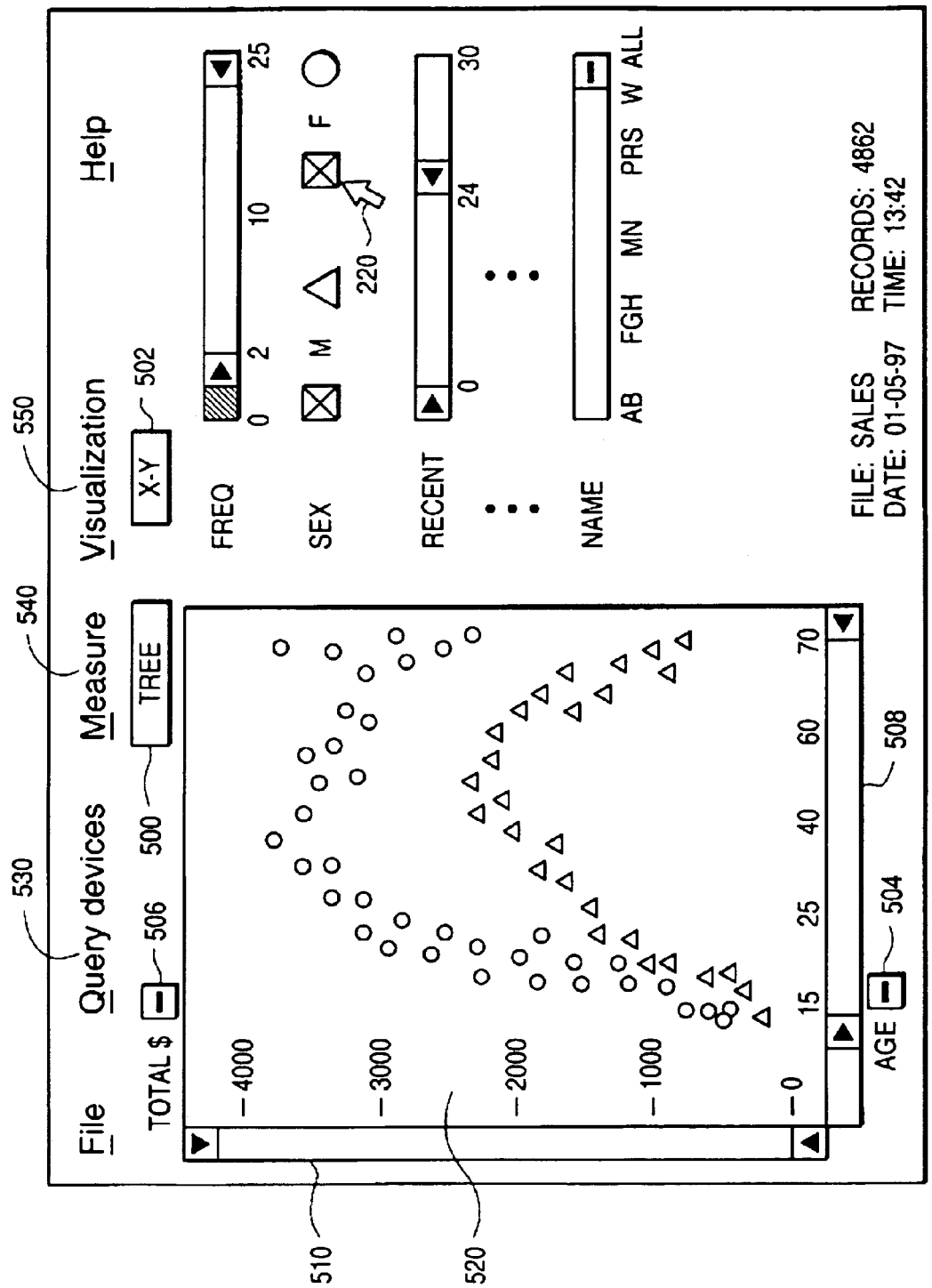
FIG. 5 illustrates a display of the results of a data base analysis using the invention.

FIG. 5 illustrates a simplified display screen corresponding to one possible set of data processed by the invention using the earlier example of a data base of sales statistics. In the example, the system has determined that the strongest relationship, given the independent variable age, is with purchase frequency, followed by sex, then recency, and so on, which is indicated to the used by displaying the corresponding query devices vertically in descending order. In the example, rangesliders were indicated and automatically selected for the fields "Frequency" and "Recency", whereas toggles were chosen for each of "Male" and "Female," since they can be plotted non-exclusively using different data markers, for example ".DELTA." and ".largecircle.". The structure detection method (measure) with the best validity value is displayed in display region 1500 as the decision tree ("TREE"). The default plot type is shown in region 502 as an X-Y plot. By activating, for example, conventional pull-down menus such as 530, 540 and 550, the user may direct the system to change the query device for any given field, the measure to be used to determine the order of dependency of the dependent variables (data fields), for the plotting the plot type or color scheme, etc.

Using a pull-down menu, the user had selected "AGE" as the independent variable, and, using a different pull-down menu 506, indicated to the system that TOTAL PURCHASES should be plotted against AGE. Rangesliders 508, 510 are preferably displayed on the respective x- and y-axes to allow the user to adjust (by moving the range markers with the cursor 220) the displayed ranges. In the illustrated example, the system plot only the data for which the frequency lies in the range 2–25, the recency lies in the range 0–24, since the user has moved the range markers of the respective range sliders accordingly.

Using known techniques, the system continually senses the state of all toggles, range and alphasliders, etc. and whenever a change is detected, it re-plots the selected relationship to include only the desired data characteristics. For example, if the user were to "click" on the toggle for "Male" ("M"), so that it is de-selected, then the system would remove the ".DELTA.-marked" data points on the plot 520. As the user changes the settings of other query devices, the system updates the display accordingly to include only the field data that falls within the indicated ranges. This allows the user to view and change the data base presentation interactively, so that there is no break in concentration and exploration of the data base for time-consuming re-submission of conventional queries.

Administrative information such as data set file name, the number of records, and the date and time may also be included on the display screen as desired and as space permits.

Part II

The invention provides a way for a user to quickly and easily perform, in the context of a graphical user interface (GUI), such operations as entering values into a data-analysis or display-control application information or navigating a highly graphical display, using text commands or alphanumeric data, but still primarily through use of graphical input/display devices. Below, the main hardware and software components in a system according to the invention are described. Then, the general inventive method is outlined, after which specific examples of the many input devices according to the invention, and examples of their uses, are illustrated and discussed.

Main System Components

Figure 6:
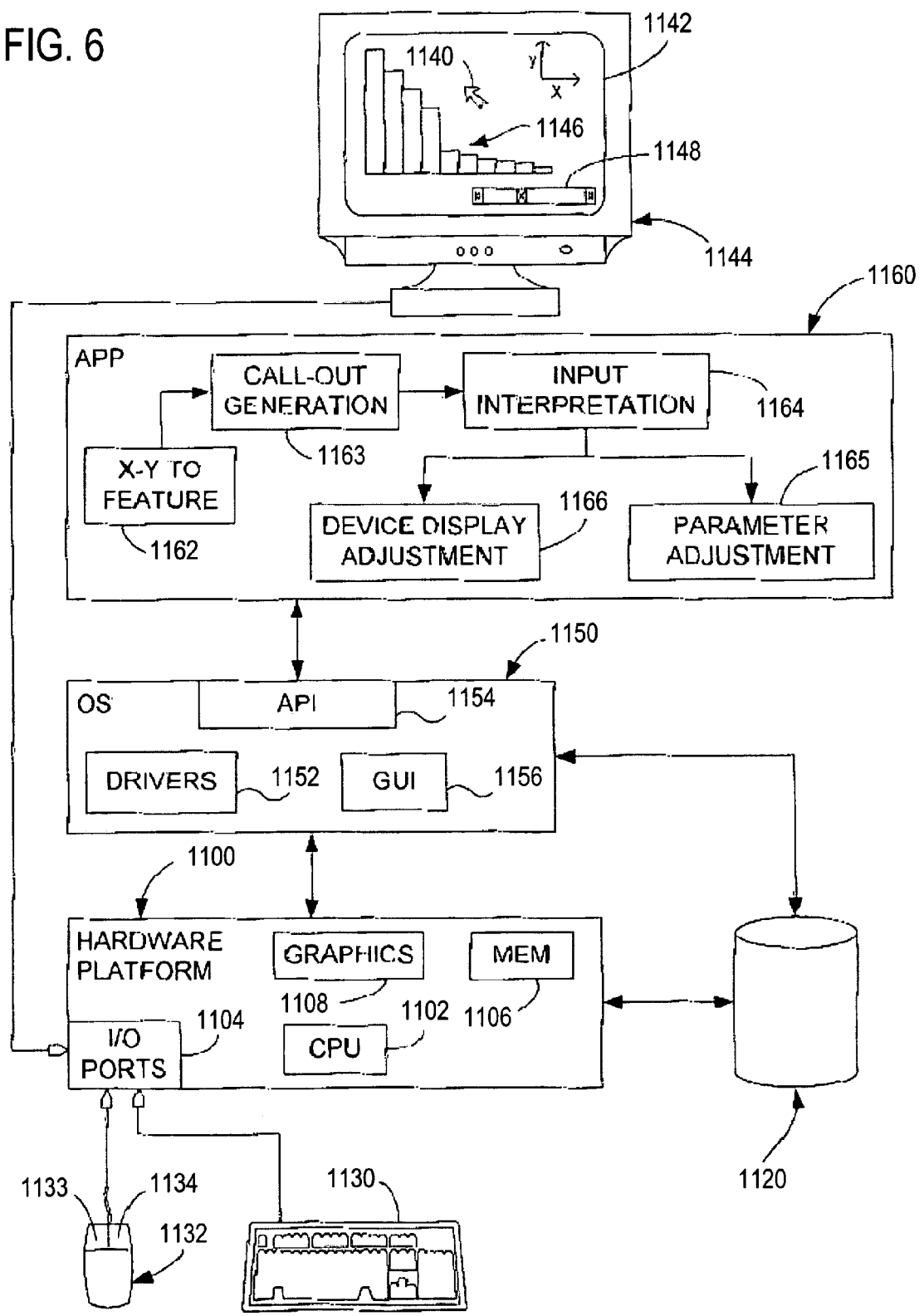
FIG. 6 is a block diagram that illustrates the main hardware and software components of a computer suitable for implementing the invention.

FIG. 6 illustrates the main components of a computer suitable for implementing the invention. A hardware platform 1100 includes one or more processors 1102, various input/output ports 1104, system memory 1106, a graphics card 1108, and any other conventional components as needed in any given system. One or more data storage devices such as a disk 1120 are also normally included.

Various physical (as opposed to purely graphical), user-operated I/O devices are connected to respective (or shared) input ports. For example, in FIG. 6, a keyboard 1130 and a mouse 1132 are shown. The operation of such physical I/O devices is very well known—indeed, modern life in almost all workplaces and even homes is usually lived with the background sounds of fingers pressing keyboard keys and clicking mouse buttons 1133, 1134. Instead of a keyboard, other equivalent devices may be used for symbolic (including alphanumeric) and/or functional (such as the standard keyboard function keys F1–F12, "Ctrl" or "Alt" or "$" keys, etc.) input; these include keyboard displays on active display screens that allow a user to select "keys" by touching the screen with a finger or stylus, as well as those that allow the user to use the stylus to "write" alphanumeric information by hand on a portion of the screen. Voice-recognition software may also replace or augment the keyboard, so that the user can enter alphanumeric data into the computer without touching anything at all.

Similarly, many other devices such as trackballs, touchpads, joysticks, etc., often take the place of the illustrated mouse 1132. Moreover, in some systems, such as handheld computers (including those referred to as "personal digital assistants"), the user selects a current position on a display screen by touching the screen with a stylus. In still other systems, in which the display is a touchscreen, the user can activate on-screen GUI devices simply by touching the screen. Voice-recognition software also often includes the ability to control an on-screen cursor, select icons, etc., using voice commands. Any keyboard or equivalent, or any mouse or equivalent, may be used to implement the invention—the only requirement is that the user should be able to designate some current active point or region (for example, by controlling the position of a cursor 1140 or other displayed position indicator using a mouse) on the display screen 1142 of a monitor 1144, laptop or handheld computer system, and to enter symbolic (including alphanumeric, or just alphabetical or numerical) and/or functional data. Furthermore, one can also use this invention even in systems, for example, those whose GUI is operated by a stylus and a touchscreen, that do not have a displayed cursor. The terms "keyboard," "mouse," and "cursor" are therefore used here as collective terms and only by way of example because these are the most common input devices and are intended to refer to their respective equivalent physical and graphical devices as well, several of which are mentioned above.

As is any other computer there is system software, in particular, an operating system 1150, which is required to support the applications, such as application 1160, that are installed to run on the computer. As in other conventional computers, the operating system 1150 includes drivers 1152 as necessary to act as an interface between the given system software and any peripheral devices. These peripheral devices will generally include the keyboard 1130, the mouse 1132, and usually the mass storage disk 1120 itself, which are connected to the hardware platform. Depending on which system hardware and software are included in any given implementation of the invention, an application program interface (API) 1154 is also included within the operating system. The nature, design and operation of drivers and API's are well known in the art of computer science and are therefore not discussed further here.

One form of interface that has particular relevance in the context of this invention is the graphical user interface (GUI) 1156, which is typically a component of the operating system, but may also include specific hardware support as needed. GUI's are also well-understood components of modern computer systems and are therefore not explained in greater detail here. The only aspects of a GUI that are relevant to an understanding of the invention are 1) the ability, together with the drivers for the various input devices and related conversion software, to relate the motion of some physical input device (such as the mouse 1132) or other user action (such as touching the display screen or entering a voice command) to the coordinate system used to generate a display on the screen 1142; 2) to thereby sense what point in the display the user has thereby selected (for example, by positioning the cursor 1140 by moving the mouse); and 3) to accept, interpret and associate with the currently selected position any input signals, such as a click of any mouse button or any keyboard entry, voice data, stylus touch, etc., made by the user.

A very common example of these GUI operations is when the user of a word-processing application moves the screen cursor over the button of a page scroll bar and, holding down a mouse button while moving the cursor downward, "drags" the button downward on the bar so as to cause the application to display some other page of the currently active document. Note that, in this case, not only is the document scrolled downward, but the position of the scroll bar button itself is continuously updated to correspond to the position of the cursor as long as the user keeps the cursor within the area of the display corresponding to the scroll bar and holds down the designated mouse button.

In order to implement these operations, the application 1160 will typically include a software module 1162 that relates the X-Y position of the cursor to whatever feature (for example, a displayed document, an icon, a "minimize" or "maximize" button, scroll bar, etc.) of the current display the tip of the cursor is over. This module 1162 thus corresponds to a GUI component within the application itself. Indeed, when running most modern software packages, the user will typically see portions of a display that are controlled by different GUI modules. For example, when running the word-processing application Microsoft Word on the Windows 2000 operating system, the user will see both a "Start" icon, which is used to communicate directly with the operating system, and various font-control icons such as "B" and "/", which are associated with the Word application.

When an on-screen device is activated, the system accepts certain actions as valid inputs that are used to control the underlying routine. The user typically activates a graphical input device simply by placing the cursor over it (or, for example, by speaking an appropriate "Select" voice command). Each graphical input device, such as an icon, menu, scroll-bar, slider, etc., thus has associated with it one or more normal or standard actions that the user performs to input data to or otherwise use the feature the device is intended to control. Any other user action is either ignored or affects (acts as a valid inputs to) some other feature.

At least one input parameter is associated with each graphical input device. In the context of this invention, these parameters are not restricted to alphanumeric input such as numbers and letters and text strings, but may also be "functional," for example, "clicks" of a mouse button or function keys of a keyboard. Thus, an input parameter here means any input caused by user action that conforms to the predetermined input format of the underlying software routine.

In most existing GUI's, as long as the user keeps the cursor over an icon, the only user actions that the system interprets as being related to the feature associated with that icon is the clicking of a mouse button—any other user action is either ignored or activates some feature unrelated to the icon. For example, if the user places the cursor over a "Save" icon, then the only relevant user action will be the clicking of a mouse button (corresponding to issuing a "run" command), which is the only valid input "parameter" to this graphical input device. If the user moves the cursor (or otherwise deselects) out of the field of the device, which is a non-standard action for this graphical device, then the device is inactivated in the sense that the GUI will no longer interpret user actions as intended to be inputs to the corresponding routine.

Similarly, when the user places the cursor within a scroll bar or slider, the only actions that affect the routine controlled by the graphical device are the clicking of a mouse button, or the holding down of a mouse button and a dragging motion of the mouse. If, using the prior art, the user were to enter a text string via the keyboard when the cursor is over the scroll bar, then the GUI will either ignore this non-standard action or assume it relates to some other feature such as text input to a currently displayed document.

In some other applications, if a user presses a scroll wheel of the mouse, then a special cursor is generated within the field of the scroll bar, which the user can place above or below the control button to direct the system to scroll up or down, respectively, with no need to drag a control button. Any other user action except pressing a mouse button, moving the mouse to move the special cursor up and down, or rolling the scroll wheel, that is, any non-standard action, causes the system to return to the state it was in before the wheel was first pressed.

Along with the other software modules that define the primary application itself (for example, data analysis or word-processing or calculation routines), the application 1160 according to the invention includes a secondary input module 1163. When this module 1163 is activated, an input interpretation module 1164 interprets data entry by the user according to the structure of a current primary graphical input device, and then applies the input data to a parameter adjustment module 1165, which adjusts the parameter in whatever routine it is associated with. A device display module 1166 then also changes the display of the primary graphical user input device (and/or removes the display of the secondary graphical input device) according to the user-entered data.

Still another module that is included in the preferred embodiment of the invention is a call-out generation module 1167 that generates and causes to be displayed some secondary graphical input device such as a call-out or text box, for example, using an existing "tool-tip" feature of a common GUI. For the sake of simplicity, the secondary graphical input device is referred to here simply as the "call-out," which is to be understood as including any other graphical device that performs the same function.

The module 1167 may be launched automatically and immediately, that is, as soon as the user positions the cursor or otherwise selects a primary graphical input device designed according to the invention. In the preferred embodiment of the invention, however, the module 1167 generates the call-out only after the user selects—activates—a primary graphical input device and takes any predetermined, valid secondary action—not immediately generating the call-out reduces on-screen distraction to the user and the operation of invention becomes more transparent, less obtrusive, and retains the look and feel of the existing GUI as much as possible.

It would also be possible according to the invention not to generate any secondary graphical input device at all, but rather simply to evaluate user actions whenever the cursor is on any primary graphical input device that has a secondary graphical input device associated with it: If the user performs a primary action, then the system assumes the user action is an input according to the protocol and format of the primary device. If the action is a secondary action, then the system assumes that input to the routine normally controlled by the primary graphical device is according to the format of the secondary device. The user takes any other action—an invalid action, then the system treats it as it normally would, that is, it either ignores it, uses it as input to some other routine, or simply deactivates the primary input device altogether. These options will become clearer by considering the examples of invention below.

All of the modules 1162–1167 may be designed and implemented using known programming techniques given the description below. Moreover, it is not necessary (although it will usually be easier) to include the modules 1162–1167 within the actual primary application 1160 itself (for example, a data mining, data visualization, or word-processing program); rather, any or all of the modules 1162–1167 may be implemented within the operating system 1150, or within a separate, dedicated application, as long as it is properly functionally linked, for example via remote procedure calls, to the primary application.

As will become clearer from the description below, the novel features provided by the invention are invoked when the user selects some primary graphical input device and then takes any predetermined secondary action associated with that primary device. On the other hand, when the invention is not invoked, the input interpretation module will perform its conventional functions. For example, if the cursor 1140 is over a portion of a document, and the user types a word via the keyboard, then the interpretation module 1164 of a word-processing application will insert the corresponding input word in the appropriate place in the data file in memory comprising the document, and will cause the operating system to call the display driver to update the display (usually via the graphics card 1108) accordingly. On the other hand, if the cursor is over a "Save" icon and the user presses ("clicks") the proper mouse button, then the application may instruct the operating system to copy the data corresponding to the document into its assigned locations in memory 1106 or on disk 1120.

As will become clearer below, the invention may be used to improve the ease of use of any type of application that uses display devices for data input. One of the many types of applications that will benefit especially from the invention, because they so often make great use of various displayed devices to select values and ranges, is data visualization. U.S. Pat. No. 6,014,661 (Ahlberg, et al., "System and method for automatic analysis of data bases and for user-controlled dynamic querying," issued 11 Jan. 2000) discloses an example of such a data visualization system.

In these applications, often very complex databases are queried. The results of the queries are then analyzed and displayed in some visual format, usually graphical, such as a bar or pie chart, scatter plot, or any of a large number of other well-known formats. Modern analysis tools then allow the user to dynamically adjust the ranges of the displayed results in order to change and see different aspects of the analysis.

Assume, for example, that a marketing analyst is interested in examining sales figures for a particular product as a function of the age of the buyers. One possible visualization of such data is illustrated in FIG. 6 as the bar chart 1146. Assuming that the age groups of the buyers form the x-axis of the chart, then this product (which one might imagine to be the overpriced recordings of one the latest cacophonous, adolescent, popular music groups) becomes decreasingly popular as the buyers become older and, one hopes, develop better taste. If the analyst then wishes to concentrate on the results for some sub-set of the displayed results, he might, for example, use the cursor to maneuver and adjust a query device such as a conventional slider 1148. Note that this example involves only two variables—sales vs. age—whereas many database analysis applications may have queries relating to a large number of different data sets. In "data mining" applications, moreover, the user may not even be aware that there is a correlative relationship between two data fields until the application makes him aware of it through the visualization.

GENERAL METHOD ACCORDING TO THE INVENTION

The invention assumes the following: Some application, such as data analysis or data mining software, or a word-processing routine, etc., generates at least one, and possibly many, on-screen primary graphical input devices, which may be of any type and need not be the same. Associated with each such graphical input device is at least one standard action, which is also referred to below as a "primary input action" or simply as a "primary action." As is explained above, a primary action is any action by the user, such as clicking a mouse button, that launches a routine normally associated with the device, that is, as it would according to the prior art. For example, with the cursor on a "zoom" icon, the only standard primary action is the pressing of a mouse button (to call up a pull-down menu or activate a slider), possibly followed by a movement of the mouse or other positioning device.

As in arrangements according to the prior art, the user (or the system itself, for example, as part of a data entry routine) selects—activates—one of the primary graphical input devices in any conventional manner, for example, by positioning a cursor over it, touching it with a stylus, by voice command, etc. This then becomes the "active" primary input device. According to the invention, as long as the user takes any primary action associated with the active device, then the system will perform as if the invention were not present. Thus, if the user drags a control button of a range slider, then its corresponding values will be adjusted accordingly, as usual.

When the system senses (in any conventional manner) that the user has selected the primary device, for example by a specified click of a mouse button, by stylus touch or voice command) it then also enables secondary user input to the primary device. Secondary input is signaled to the system by the user taking any predefined secondary input actions or, simply "secondary actions". If the user takes any secondary action, then the system accepts these actions as secondary inputs to the routine associated with the primary device. For the sake of confirmation, and to make it easier for the user to see what he is doing, a secondary graphical input device is preferably displayed, along with the primary, whenever the user begins to perform some secondary action. If the user takes any other action besides a primary or secondary action, that is, an "invalid" action, then both the primary and secondary graphical input devices are preferably inactivated. These concepts will become clearer and more concrete by considering the examples given below. When secondary input is enabled, the user may input any symbolic or functional data using the keyboard as appropriate to the data type associated with the on-screen input device. The system then interprets the input data and acts accordingly, preferably adjusting the display of the primary input device to correspond to the input. Several specific examples will be given below in order to illustrate these general concepts.

EXAMPLES OF SECONDARY INPUT ACCORDING TO THE INVENTION

Figure 7:
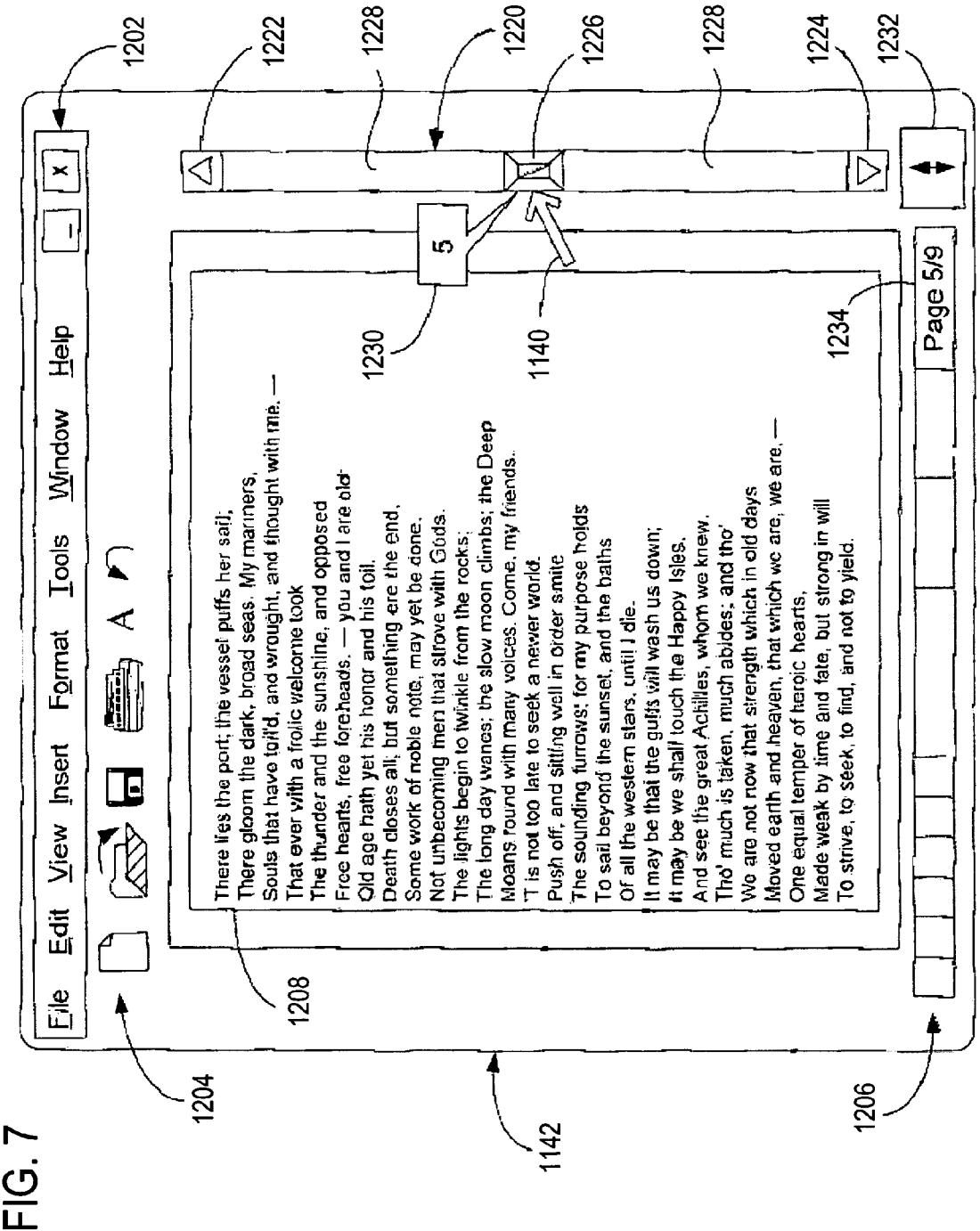
FIG. 7 illustrates a single-entry graphical input device according to the invention as it could be used, for example, to select displayed pages of a multi-page document or file.

FIG. 7 illustrates what a user might view on the display screen 1142 while using a common word-processing application. Such a display will typically include both primarily text-based menu bars 1202 and primarily icon-based toolbars 1204, as well as status information fields 1206 and the displayed representation of the multi-page document 1208 itself.

A scroll bar, indicated generally as display field 1220, has optional end delimiters 1222, 1224. By positioning the cursor 1140 over either delimiter 1222, 1224 and holding down a mouse button, the user can direct the application to scroll the displayed document up or down. Scrolling can also be accomplished by placing the cursor over a displayed control button 1226 and dragging it up or downward, whereby the display of the button will appear to move within a range field 1228 of the scroll bar and the display of the document 1208 will be adjusted accordingly. In some applications, such as Microsoft Word, a small window (not shown) may also be displayed adjacent to the range field to show which page is indicated by the current position of the button 1226.

In Word, the display of the document is not actually updated until the user releases the mouse button. In other applications, such as Word Perfect, the display itself scrolls as the button 1226 is moved. All of these features are very well known to any user of modern computer applications and are therefore not described in greater detail here. What is important to note, however, is that the user of this prior art arrangement controls the scroll bar and the resulting display entirely by maneuvering the mouse to control the cursor to adjust the button—even if a window is displayed to show the user what the indicated page is, the user must still carefully and accurately drag the button 1226 to avoid undershooting or overshooting the desired page.

According to the invention, however, whenever the system senses that the user has selected, that is, activated, some primary graphical input device, for example by maneuvering the cursor 1140 into an activation field of the scroll bar 1220, it accepts both primary and secondary user actions as valid inputs to the scroll bar routine, that is, the software module that determines which portion of a document is to be displayed based on the position of the button 1226 on the scroll bar. In this case, and assuming by way of example that the user is using Microsoft Word 97, a primary user action would be any existing action used to control the scroll bar—a mouse click above or below the button, or a mouse click (held) on the button followed by a dragging motion with the mouse. In the prior art, any other user action (for example, entering the number "5" via the keyboard) will either be ignored by the operating system or (for example, moving the cursor off the scroll bar entirely) will cause the scroll bar to be deactivated in the sense that further user actions will not affect the state of the scroll bar.

According to the invention, however, when the user selects the primary device (here, scroll bar), the system also interprets secondary user actions as valid inputs to the underlying executable routine. In this case, a secondary action will be any keyboard (or stylus, or voice) entry that indicates a scrolling instruction but that is not a primary action. In the example illustrated in FIG. 7, two types of secondary actions could be allowed: 1) any numerical value that indicates, for example, which page number to display (scroll to), or a number of pages down or up to scroll to (indicated, for example, by positive and negative integers, respectively.); and 2) a text string that the system should search for and then move the display to.

For example, as FIG. 7 illustrates, once the cursor 1140 is in the activation region of the secondary input device, the user can input the desired page number, such as "5," using the keyboard. The system then preferably, for the sake of confirmation, launches the call-out generation module 1167 so that the call-out 1230 is displayed with the entered data ("5") shown within it.

Note that it is not strictly necessary according to the invention ever to generate and display any secondary graphical device such as the call-out—the system can simply accept any valid secondary input and act accordingly. Some secondary graphical input device is preferably displayed, however, not only to allow the user to see what he is entering (which is especially useful where the secondary input is a text string, to avoid mis-typing), but also as a reminder that he has in fact just begun secondary input. Generation and display of the call-out 1230 is therefore assumed in the examples below.

The system then, either automatically or after user confirmation (for example, clicking a designated mouse button one or more times, or pushing the "Enter" key on the keyboard), changes the active display to be page 5 without the user having to drag the button 1226. At the same time, the system preferably updates the displayed position of the button 1226 to correspond to the "Page 5" position it would have had if the user had dragged it there.

The system may then remove the call-out 1230 from the display either immediately, or only after the user moves the cursor out of the activation region or otherwise de-selects or inactivates the primary graphical input device. In the preferred embodiment of the invention, the secondary input device 1230 is removed from the screen as soon as the user performs any action other than one of the predetermined secondary actions. In order to prevent the system from displaying the secondary input device 1230 unnecessarily, it is preferable to require the user to move the cursor out of any activation region and then back into it in order for a new call-out to be displayed and new data entry enabled.

In the preferred embodiment of the invention, the system accepts input—primary and secondary—to a primary graphical input device as long as the device is active. Thus, primary and secondary input will be enabled simultaneously. This is not necessary, however; rather, depending on the needs of a given application, the user could also be required to do something to specifically enable secondary input. For example, a user might be required to position the cursor on one or more pre-defined, dedicated activation fields associated with the primary device. This feature will be particularly useful where the primary graphical input device is designed to accept more than one input value, for example, the limits of a parameter range. In this case, the activation region(s) of the graphical input device 1220 should preferably be chosen to allow the greatest ease of use of the invention by the user; this may of course vary with the application and can be determined using normal GUI design considerations. One example of an activation region for the device 1220 could be the region of (that is the portion of the display lying within the coordinates for) the displayed button 1226 itself, and/or anywhere in the range field 1228 on either side of the button, and/or within either delimiter 1222, 1224.

It would also be possible to include in the display a special activation field, for example, with a dedicated icon 1232 that is separate from the graphical input device 1220 but functionally associated with it by the GUI. In order to make it easier to use, such a separate activation region should preferably be displayed at least near the input device with which it is associated, or near some other field or icon 1234 that is related to the parameter to be input (here, page number).

If specific user action is to be required to enable user input, then arranging the corresponding activation field as a sub-region of the graphical input device itself is preferred, especially where the primary device sets more than one parameter. First, it is more intuitive to use, since the user assumes that operations relating to a graphical input device can be done by pointing at the device. Second, it does not require any persistent change to what the application displays (for example, the call-out 1230 preferably disappears after the input operation) change. Third, in applications such as data analysis, there are often many primary graphical input devices, and all secondary graphical input devices will be immediately associated with their respective primary input devices without cluttering the display screen and causing confusion. Even in common word-processing programs, for example, there will usually be at least two scroll bars active at any given time: A vertical bar for up-down page scrolling and a horizontal bar for lef-right page scrolling. Fourth, the user will not need to decide before moving the cursor whether he will use primary or secondary input.

More than one activation region may be provided for a single primary device. Continuing with the scroll bar example, in FIG. 7, the regions of the scroll bar above and below the button 1226 could be "up" and "down" activation regions, respectively. Note that they already are interpreted differently by most existing word-processing programs: clicking in the "up" region is interpreted as a "page-up" command and clicking in the "down" region is interpreted as a "page-down" command. Such clicking is a primary action for the device. As just one example of how the invention could be configured in this application, the different activation regions could retain their directional function, but a secondary action could be enabled for each: The interpretation module 1164 could then interpret entry of a text string such as "Spotfire" or "Detailed Description" above/below the button as a command to search upward/downward for the string and to change the display to show the page on which the string is found. Similarly, entering a numerical value such as "3" above/below the button could mean to scroll upward/downward by three pages.

Note that this string searching capability of the invention is not limited to use with word-processing programs. For example, when viewing a page of Internet content using a standard browser such as Internet Explorer, the only primary actions normally allowed when the cursor is over a displayed page are to operate a scroll wheel or to move the cursor to some other device field such as a "Back" icon. By designating any part of a browser display (including anywhere in the displayed page itself) as an activation field, an alphanumeric keyboard entry could be interpreted as a valid secondary action. By typing, for example, "Spotfire," the browser could then be instructed to find the next occurrence of this text string in the document, or to highlight all occurrences, etc. As long as the activation field(s) and valid secondary actions are made known to the user, any data could be input using the invention that would otherwise require using the existing primary graphical input devices.

Figure 8A:
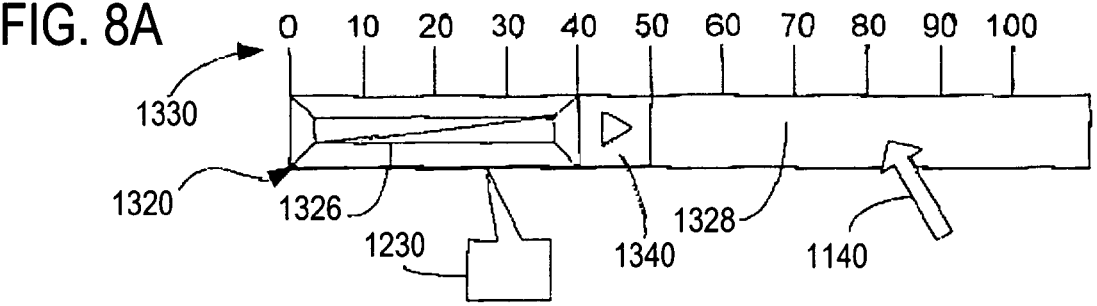
FIGS. 8A–8C show three different stages of data entry using one example a one-sided range slider—of a graphical input device according to the invention.
Figure 8B:
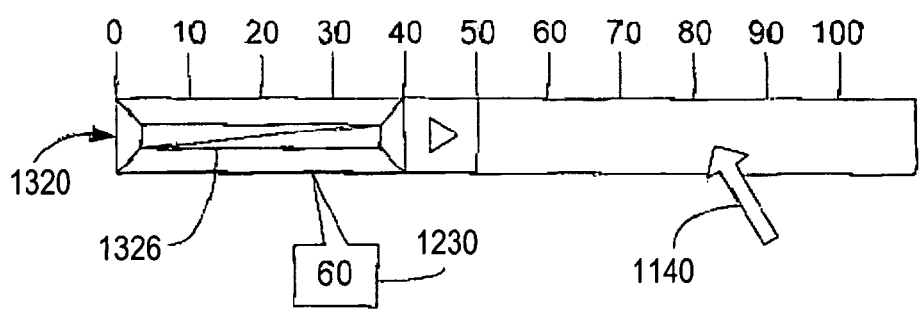
Figure 8C:
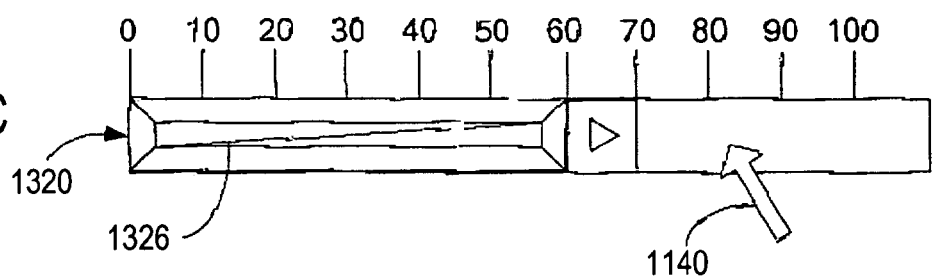

FIGS. 8A–8C illustrate the invention as it might be used in a data analysis or visualization application. In these applications, the, primary graphical input device 1320 is a graphically adjustable device commonly referred to as a "slider", "alphaslider," "Range slider," or "Item slider" which usually has the same general appearance and function as a scroll bar (which itself can be considered as a type of slider), but is usually (but not necessarily) used to select a range of values instead of just a single value. Sliders may have many different structures depending on the type of parameter (for example search query range) they are intended to control. The invention can be used with all such devices.

Of course, a full display of the results of a data analysis would normally include some form of plot or table showing the results—the slider would be used to adjust, for example, some aspect of the display, or to submit a data base query. Only the slider is shown in FIGS. 8A–8C merely for the sake of simplicity: It is well know in the arts of data base management, data mining, and data visualization how sliders are used to control displays and the invention may be used to advantage along with any such conventional techniques.

One difference between a typical slider 1320 and a typical scroll bar is that the slider will usually have either some adjacent scale 1330 or other feature to show the user what range is currently indicated. Merely by way of simple example, the scale 1330 in FIGS. 8A–8C is a scale from 0 to 100, for example indicating a percentage; the actual scale used will of course depend on many factors, such as what data type the slider corresponds to, the distribution and number of "hits" in a data base query, etc.

The slider may also be provided with some indicator 1340 that makes it easier for the user to position the cursor 1140 for dragging one edge of the button. In this example, the user would normally, that is, according to the prior art, adjust the range of the slider from 0 to some value by dragging the indicator 1340 to the right until the right edge of the button aligns with the desired value. In FIGS. 8A and 8B, the current range indicated by the slider is 0–40. In data visualization applications, for example, this will then lead to a corresponding change in what values are displayed, what new query is submitted, etc.

Using the invention, however, the user positions the cursor 1140 within a predetermined activation field of the slider, for example, by pointing to the button 1326, or adjacent to some other suitable and easy-to-see feature. As FIGS. 8A and 8B illustrate, the activation region 1328 need not be on any particular displayed feature such as the button 1326, but rather may comprise any predetermined portion of the displayed device, as long as this portion is made known to the user.

The user may then enter any desired value, for example "60," using the keyboard, which the system then preferably displays within the call-out for the sake of confirmation (see FIG. 8B). FIG. 8A illustrates how the system may generate a blank call-out (empty input field) as soon as the user points to the activation field. As is mentioned above, however, the call-out is preferably not generated until the user begins some valid secondary action, such as entering the "6" of "60". Thus, the preferred initial configuration in this example is FIG. 8B.

Once the user takes whatever predetermined confirmation action is required, if any, for example, pressing the "Enter" key or a designated mouse button, then the system accepts and interprets the entry, and adjusts the corresponding parameter and the size of the button accordingly, just as if the user had adjusted the device completely. The final state of the slider in this example is shown in FIG. 8C.

Figure 9A:
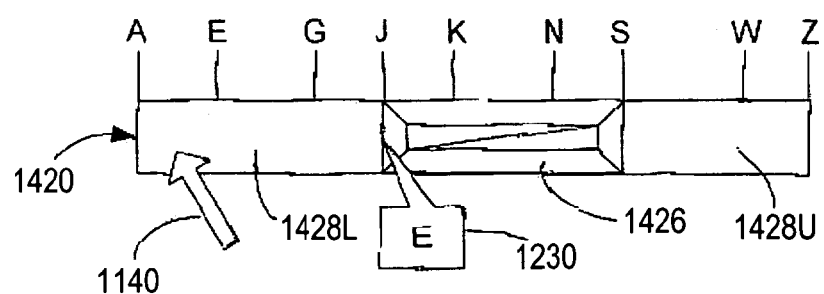
FIGS. 9A and 9B show two stages of data entry using another example—a two-sided range slider—of a graphical input device according to the invention.
Figure 9B:
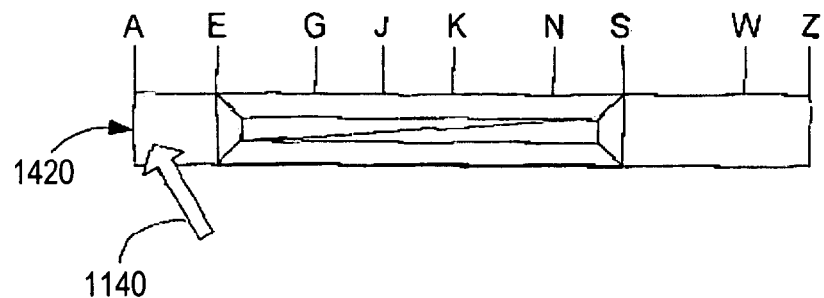

The invention is not restricted to use with primary graphical input devices that provide for entry of only a single parameter. FIGS. 9A and 9B illustrate one of many examples of a slider 1420 that allows a user to graphically adjust both the upper and lower limits of a range of values. In conventional sliders, the only valid user actions are clicking a mouse to the left or right of the button or dragging either edge. In the illustrated example, the right and left edges of the button 1426 can be dragged individually to specify the upper and lower limits of an alphabetical input parameter range. As shown in FIG. 9A, the current input range is J–S. According to the invention, however, these actions are only the primary actions that are associated with the slider.

A different activation region is then predetermined and associated with each parameter. For example, as in FIG. 9A, the region 1428L of the slider to the left of the button 1436 is an activation region for the lower limit parameter and the region 1428U of the slider to the right of the button 1436 is an activation region for the upper limit parameter. When the user positions the cursor in either activation region, then the system enables secondary input for the respective parameter. Upon sensing such secondary action, if the system preferably generates the call-out 1230 adjacent to that region, for example, pointing to the edge of the button that the user would otherwise have to drag. The user can then enter the desired parameter as before. FIGS. 9A and 9B show how the user adjusts the lower bound from J to E. As before, once the entry, here "E", is confirmed, the system adjusts the input range and size of the button accordingly, and preferably also stops displaying the call-out. In the example shown in FIGS. 9A and 9B, the input is assumed to be alphabetical. The valid secondary actions for this device would thus be an alphabetical entry using the keyboard (or stylus, or voice, etc.).

In general, to reduce the need for the keyboard, there is preferably one activation region (sub-region) for each adjustable parameter of a multi-parameter primary graphical input device. By slightly complicating the entry format, however, it would also be possible to use a single activation region and call-out to enter either or both (or all) parameters. One way to accomplish this would be to allow the user to enter multiple values separated by some predetermined separator such as a dash, semi-colon, colon, etc. Single entries could be assigned to the corresponding parameter as before, that is, as a function of the current location (activation region) of the cursor. Multiple entries, however, would be interpreted as a requested change of each parameter entered. For example, if the user enters "E–W" into the call-out 1230, then the system adjusts both the lower and upper bounds of the parameter accordingly.

One other way to enable multiple entries would be for the call-out to be displayed initially with the current range(s) or value(s) of the input device. The user may then select and change any or all of the displayed parameters at once. After confirming the entry, the system can then adjust all parameters (or just all changed parameters) accordingly. For example, in FIG. 9A, the call-out could initially contain the display "J–S", using any separator such as a dash, semicolon, colon, etc., or even separate fields—one per parameter—which are selected using the mouse. The user could then change the call-out contents to "E–S" to cause the range change shown in FIG. 9B. One advantage of this multi-entry call-out is that it allows the user to adjust more than one parameter without having to reposition the cursor into different activation sub-regions in order to change more than one parameter. This feature may be particularly valuable in applications that analyze or at least query large databases, which might otherwise execute a completely new query as soon as one parameter is changed, even though the user is interested in new results only for a change in two or more parameters.

Figure 10A:
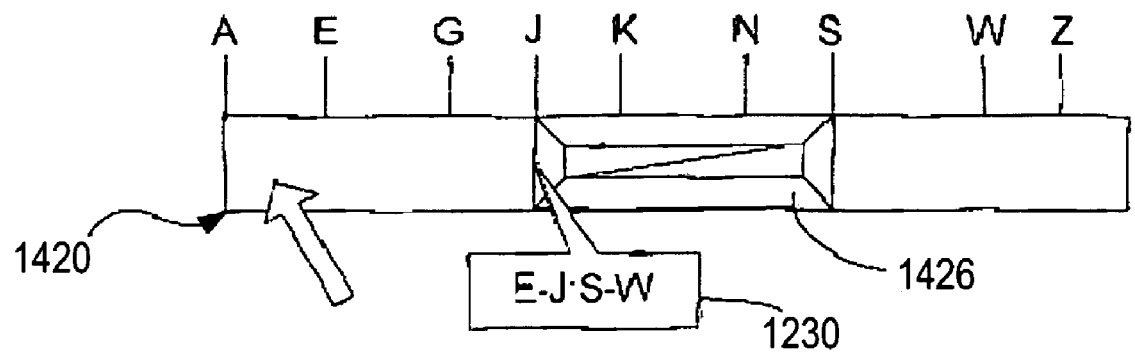
FIGS. 10A and 10B show two stages of data entry using still another example of a graphical input device according to the invention, in this case, a non-linear range indicator, namely.
Figure 10B:
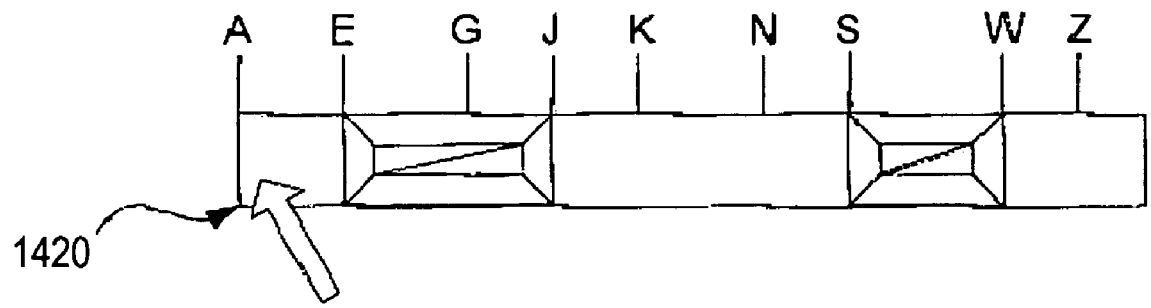

Multiple-parameter entry (for example, into a displayed call-out) according to the invention may also be used not only to adjust the input range(s) of a given (such as the button 1426), but also to change the nature and number of the adjustment features themselves. FIGS. 10A and 10B illustrate this possibility. Given the same slider 1420 as in FIG. 9A, assume the user enters multiple ranges, not just multiple values, into the call-out 1230. In FIG. 10A, for example the user has entered "E–J;S–W". The system then interprets this to indicate a query (or display control) having two ranges. It then also subdivides the single button 1426 accordingly, as is illustrated in FIG. 10B. Activation sub-regions can then be established for each of the now four separate input parameters.

Conversely, if the user enters a single range, perhaps with a null value for an other multiple ranges, the user could indicate to the system that it should join currently separate ranges. For example, given the slider as shown in FIG. 10B, if the user moves the cursor out of any activation range (to reset the call-out display feature), and then back in, and then enters, for example, "J–S;" (using a semi-colon as separator but no value for the right button) the display would return to its state as shown in FIG. 10A and the two ranges E–J and S—W would be replaced with the new, single range; the two buttons in FIG. 10A will also be joined into a single button, corresponding to the now single value range.

Using conventional graphical input devices, these range sub-division and joining operations cannot usually be accomplished at all, or else they require several mouse clicks, dragging operations, and/or keyboard entries. Using this embodiment of the invention, the desired subdivision (or joining) of the query range(s) can be accomplished with very few keyboard entries, and actually less (and less precise) cursor motion than is required in the prior art simply to adjust a single value using a slider.

Figure 11A:
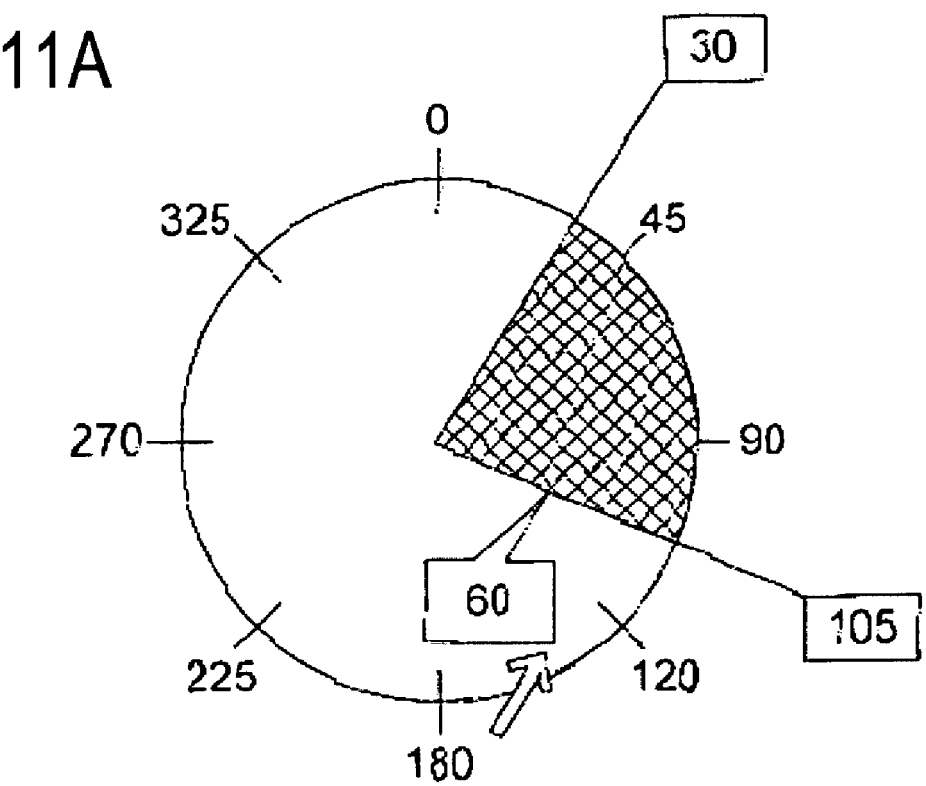
FIGS. 11A and 11B multiple parameter adjustment using a graphical input device according to the invention.
Figure 11B:
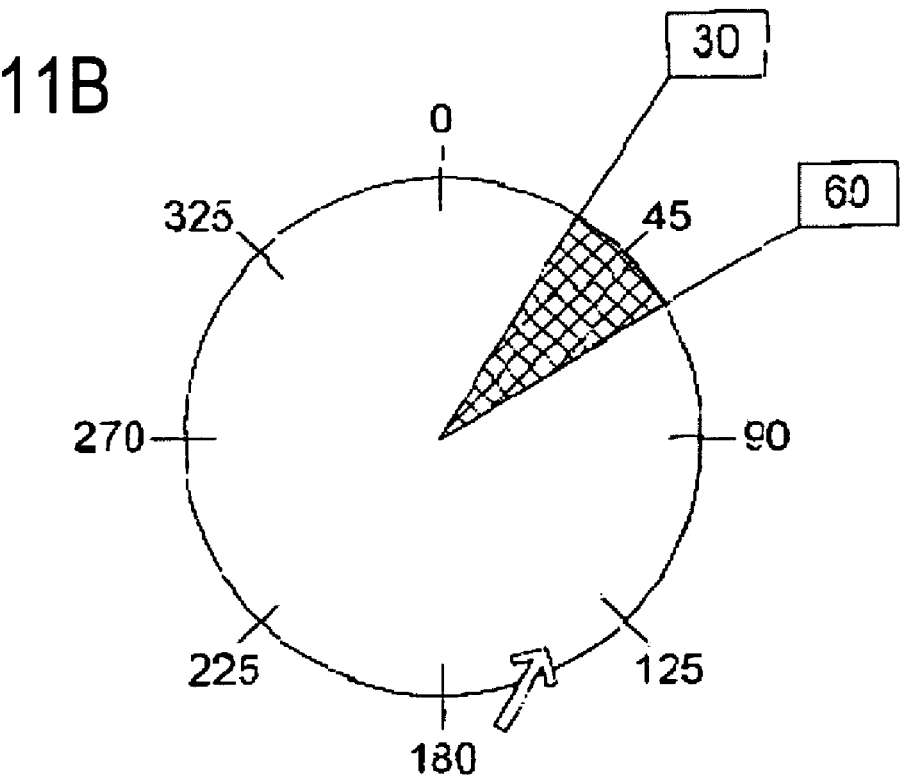

As FIGS. 11A and 11B show, the invention may also be used with non-linear graphical input devices. In this example, an angular range from 0 to 360 degrees is normally specified by dragging azimuth lines, which, in FIG. 11B, are shown as setting the angular range from 30 degrees to 105 degrees. Displays such as these are found, for example, on radar screens, which use the azimuth lines, for example, to define alarm sectors. (Objects located within the sector cause an alarm to sound).

Using the invention, an activation region may be designated for each azimuth line, for example, anywhere near the desired line. The line itself, or some indicator (such as the tag box showing the current angle 105) could then be caused to blink, or be displayed in a different color, etc., to indicate that the cursor is within the activation zone for that line. (Similar graphical techniques could of course be used in the examples of other input devices above.) As before, the system then generates a secondary graphical input device (here, again, a call-out) adjacent to the selected azimuth line. The user can then enter a new value; the azimuth line (and the corresponding parameter) is then adjusted accordingly. In FIGS. 11A and 11B, for example, the user has changed the azimuth range from 30–105 to 30–60 degrees.

Figure 12A:
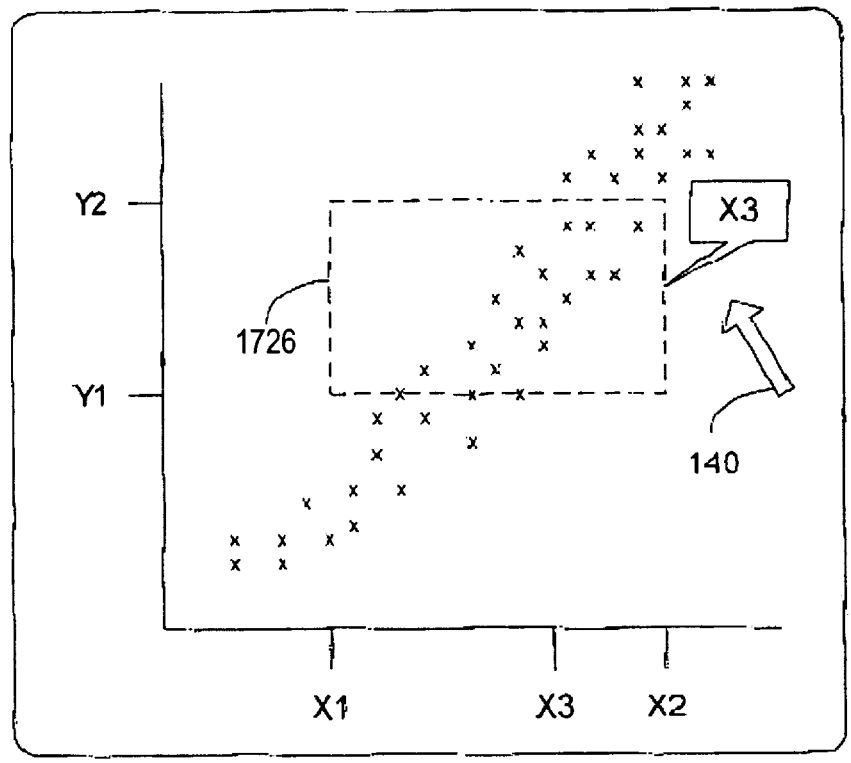
FIGS. 12A and 12B illustrate the use of the invention to adjust a two-dimensional graphical input device.
Figure 12B:
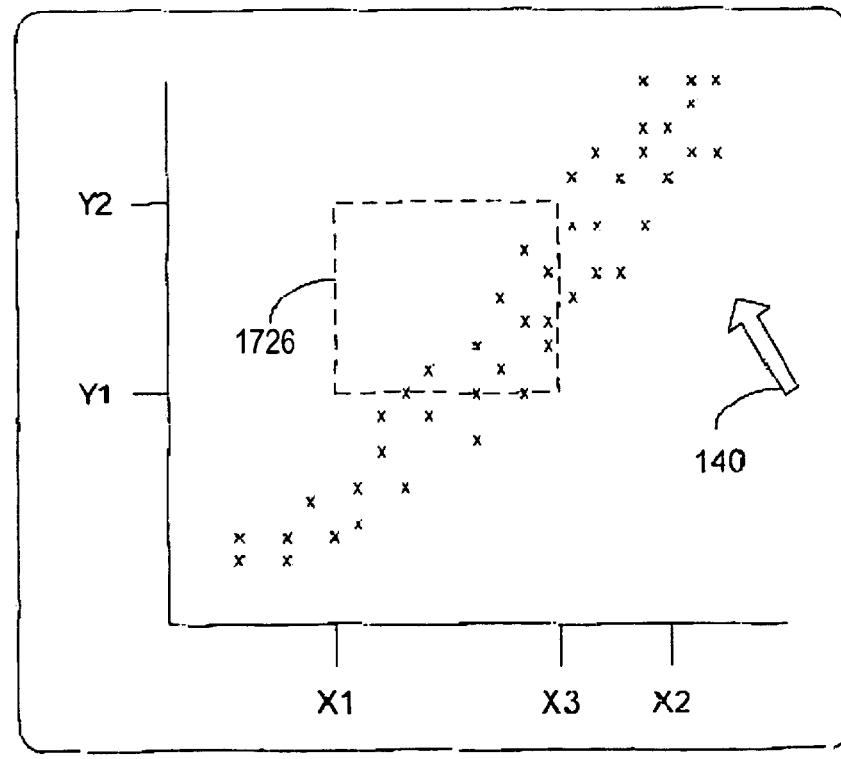

FIGS. 12A and 12B illustrate how the techniques according to the invention can be used to adjust a multi-dimensional primary graphical input device, which, in this example, is a window 1726 around a sub-set of data points (shown as "x's") in an X-Y plot. In this case, there are four parameters that can be adjusted, namely, the lower and upper bounds for both the X and Y parameters. Each edge of the window 1726 thus functions as a single-parameter primary graphical input device. For each, an activation region is defined in any predetermined manner and whenever the cursor is moved into that region, secondary input is enabled (and a call-out is preferably displayed) so that the user can directly enter a new value for the corresponding parameter bound, without having to drag an edge of the window with the mouse. In FIGS. 12A and 12B, the activation region for the upper X limit is, for example, to the right of the window, but between the current upper and lower limits for the Y parameter. The user has changed the upper X limit from X2 to X3.

As is mentioned above, an input parameter in the sense of this invention means any input caused by user action that conforms to the predetermined input format of the underlying software routine. The input parameter(s) that may be entered using the invention are not limited to those directly associated with a particular graphical input device. Rather the invention may be used to input parameters according to predetermined heuristic rules.

As just one of many possibilities, assume that the range slider 1420 (FIG. 9A) is used primarily to adjust some parameter P, which is represented as a column in a data structure used in a data mining and visualization routine that generates a histogram such as is shown in FIG. 6 as plot 1146. As before, the user could position the cursor 1140 over the slider and enter a value such as the illustrated value "E". According to this "heuristic" embodiment of the invention, the user could instead enter some other input such "4 bins" to indicate to the underlying routine that the single column used to represent P should instead be subdivided into four columns.

As another example, assume the user places the cursor over the range slider 1420 and types "blue". The underlying routine could then interpret this entry not as an adjustment of the parameter P, but rather as an instruction to use the color blue to display its visualization of whatever parameter the slider 1420 controls.

As still another example, assume the user of a web browser positions the cursor over a standard "Back" icon. In conventional browsers, the only acceptable primary input is the click of a mouse button (or equivalent). Using this heuristic embodiment of the invention, however, the user might instead enter via the keyboard a text entry such as "Spotfire". The browser could then interpret this as an instruction to search backward through the user's browsing history to find the first web site that contains the word "Spotfire", for example, www.spotfire.com. Entering a number n could instead be interpreted as an instruction to go to the n'th earlier web page viewed.

As yet another example, assume that the user is working with a statistical analysis program and that this program has an on-screen toolbar icon used to select various statistical algorithms by means of some primary input parameter. Using the invention, the user could, for example, position the cursor over the icon and enter some secondary input parameter such as "4 K-mean", which the underlying program could interpret as an instruction to select for execution from among different available algorithms execute an analysis algorithm that performs "K-means clustering" with an argument of "4". Note that this is also of an example of a secondary input entry that has more than one "part," that is, that allows for entry of more than one heuristic parameter. If desired or necessary to make it easier or possible for the underlying application to parse distinguish which type of the user is attempting, prefixes such as "#" or "$" or other type (or characteristic) identifiers may also be used to indicate particular input types.

Indeed, it is also possible according to the invention to use a single primary input device for entry of different types of secondary input parameters, or even third- or fourth-order, etc. parameters. For example, combining two examples above, assume that the statistical analysis program is also the program used to generate the histogram. Assume further that the range slider's primary input parameter is a range of numerical values set by dragging the edges of the button 1426. The primary input action is therefore dragging of the button, or its edges, using a mouse (or equivalent). Assume the scale of the range slider is from 0 to 100 (as in FIGS. 8A–8C) and that the user wishes to adjust the range of the corresponding parameter to [50,80].

The standard action to accomplish this would be to drag the left edge of the button to be aligned with the "50" scale entry and the right edge to "80". As is mentioned above, according to the invention, the user could instead place the cursor on the slider and type "50;80". This is an example of a secondary input that is of the same type (here, numeric), that is, has the same characteristic, and is used to input the same parameter(s) as the primary input device itself. Assuming the underlying GUI is so designed and that the analysis program has such parameters, however, then according to this embodiment of the invention, the user might instead type "blue," or "4 K-mean," which the GUI then parses (using any conventional methods) and passes to the analysis routine as instructions to change the corresponding display portion to blue, or the analysis to 4-K mean clustering.

Expressed more generally, assume an underlying routine that generates and interprets a primary user action as inputting one or more value(s) Vi for primary input parameters when a graphical input device is selected. According to the invention, at least one secondary user action (which generates secondary input parameter(s)) is interpreted either as inputting the value(s) Vi, or as inputting value(s) corresponding to some other aspect or feature of the underlying routine, which may, but need not, be of the same data type or have the same distinguishing characteristic(s) as the value(s). All that is required to implement the invention in these cases is any conventionally designed parsing or type-identification routine to distinguish whether the entered value is a primary or secondary input parameter, and that the user be made aware of the predetermined semantics for and meanings of allowable secondary user actions (secondary input parameters).

In all of these "heuristic" embodiments of the invention, the graphical input device is associated with some underlying executing application. This application has one or more user-controllable, that is, user-selectable, features, such as not only the range of input parameters, but also the type of analysis to be performed, the method of display or other presentation to be used, etc. The application then, using conventional GUI technology, causes at least one graphical input device to be displayed for the user. One or more primary input parameters having first predetermined data types or structures are associated with this graphical input device and are used as inputs to set or adjust a first feature of the application.

According to the invention, however, the user is also allowed to enter at least one secondary input value by means of secondary user actions. This (these) secondary value(s)

may be of the same first predetermined data type or structure, in which case they are used to control or adjust the same first feature of the application. On the other hand, in this heuristic embodiment of the invention, the secondary input parameters may also be of a second predetermined data type or structure. When the application senses this, then it applies the input values to control or adjust some other feature of the application. For example, entering a numerical value might be interpreted as the value for a range slider used to set the value of an input parameter to a current analysis algorithm (a first feature), whereas entering "4 K-mean" might be interpreted as selecting which algorithm (a different, second feature) is to be applied.

As long as the underlying GUI for a given program is designed to determine when a position indicator such as a cursor lies within some delimited region of a display screen, the invention may also be used to "convert" an on-screen object not normally used for input into one that is. In these cases, the primary input parameter is a "null" value, or it may be one or more mouse clicks and/or mouse movements used to activate the object to allow for resizing, repositioning by dragging, or a selection from a pull-down menu of such features as deletion, borders, etc. For example, assume that the user is working with a drawing program such as a CAD application, or even with a mixed text/graphics application such as Microsoft PowerPoint. Assume further that the user positions the cursor over, for example, a display of a red circle. By typing "blue" or "new" for example, without preceding it with a mouse click, the underlying program could change the color of the circle, or create a copy of it. In cases such as these, the secondary input actions are used to control the on-screen display of the "input" device itself.

What is claimed is:

1. A method for visualizing data from a stored data set, comprising:
    retrieving a plurality of data records from the stored data set, wherein each record includes a plurality of fields,
    automatically detecting from the data records retrieved from the stored data set a minimum value and a maximum value for a data range for each of at least a plurality of the fields in the data records retrieved from the stored data set,
    automatically assigning a display query device to each of the plurality of fields,
    automatically assigning scales to the display query devices for each of the plurality of fields based on the automatically detected minimum and maximum values,
    automatically assigning an order to the display query devices for each of the plurality of fields based on information in the stored data set,
    displaying a graphical visualization of relationships between at least a subset of the data records retrieved from the stored data set,
    displaying the display query devices in the older automatically assigned to them,
    sensing adjustment by the user of one or more of the query devices, and
    updating the graphical visualization based on the sensed adjustments of the query devices.

2. The method of claim 1 wherein automatically assigning a query device to each of the plurality of fields automatically assigns at least one graphical query device that responds to at least one graphical primary user input action that corresponds to a value of one of the fields and responds to at least one non-graphical, secondary user input action corresponding to a value of one of the fields.

3. The method of claim 1 wherein automatically assigning a query device to each of the plurality of fields automatically assigns at least one query device that includes a slider.

4. The method of claim 3 wherein automatically assigning a query device to each of the plurality of fields automatically assigns at least one query device that includes a plurality of sliders for selecting a range of one of the fields.

5. The method of claim 1 further including automatically detecting a data type for at least the plurality of fields and wherein automatically assigning a query device automatically assigns at least some of the query devices based on results of automatically detecting a data type.

6. The method of claim 5 wherein automatically assigning a display query device automatically assigns one of a plurality of types of query device in response to automatically detecting a data type.

7. The method of claim 5 wherein automatically detecting a data type detects field names from the stored data set.

8. The method of claim 5 wherein detecting maximum and minimum values is based on automatically detecting a data type.

9. The method of claim 5 wherein automatically assigning a query device to each of the plurality of fields assigns different types of query devices to different fields based on results of automatically detecting a data type.

10. The method of claim 9 wherein detecting maximum and minimum values for the different fields is based on automatically detecting a data type for the different fields.

11. The method of claim 1 wherein automatically assigning a display query device assigns one of a plurality of different types of query device in response to automatically detecting a data range.

12. The method of claim 1 wherein automatically assigning a display query device assigns one of a plurality of different types of query device in response to user input.

13. The method of claim 1 wherein displaying a visualization displays a visualization that shows a relationship between an independent field and a plurality of dependent fields and further including selecting one of the fields to assign to be the independent field.

14. The method of claim 13 wherein selecting one of the fields to assign to be the independent field is based on user input.

15. The method of claim 13 wherein selecting one of the fields to assign to be the independent field is automatic.

16. The method of claim 1 wherein the data set is stored in a database.

17. The method of claim 1 wherein the data set is stored in a data set file.

18. The method of claim 1 wherein the assignments made in automatically assigning are user-changeable.

19. The method of claim 1 wherein the visualization includes an X-Y plot.

20. The method of claim 1 wherein the visualization includes a bar graph.

21. The method of claim 1 wherein the visualization includes a pie chart.

22. The method of claim 1 wherein detecting maximum and minimum values is based on sampling the stored data set.

23. The method of claim 1 wherein automatically assigning an order is based on the evaluation of relationships between a field for an independent variable and a plurality of fields for dependent variables independent of a preexisting order of the fields.

24. A system for visualizing data from a data set, comprising:
- storage for the data set,
- a channel to access the storage,
- a user input device,
- a display device, and
- a main processing system connected through the channel for communication with the stored data set in the storage, the main processing system being operative to:
    - retrieve a plurality of data records from the data set through the channel, wherein each record includes a plurality of fields,
    - automatically detect from the data records retrieved from the data set a minimum value and a maximum value for a data range for each of at least a plurality of the fields in the data records retrieved from the data set,
    - automatically assign a display query device to each of the plurality of fields,
    - automatically assign scales to the display query devices for the plurality of fields based on the minimum and maximum values,
    - automatically assign an order to the display query devices for each of the plurality of fields based on information in the data set,
    - display on the display device a graphical visualization of relationships between at least a subset of the data records retrieved from the data set,
    - display the display query devices in the order assigned to them,
    - sense adjustment by the user using of one or more of the query devices by means of the user input device, and
    - update the graphical visualization on the display device based on adjustments of the query devices.

25. The system of claim 24 wherein the main processing system is further operative to automatically detect a data type for the fields.

26. A system for visualizing data from a stored data set, comprising:
- means for retrieving a plurality of data records from the stored data set, wherein each record includes a plurality of fields,
- means for automatically detecting from the data records retrieved from the stored data set a minimum value and a maximum value for a data range for each of at least a plurality of the fields in the data records retrieved from the stored data set,
- means for automatically assigning a display query device to each of the plurality of fields,
- means for automatically assigning scales to the display query devices for each of the plurality of fields based on the minimum and maximum values detected by the means for automatically detecting,
- means for automatically assigning an order to the display query devices for each of the plurality of fields based on information in the stored data set and for displaying the display query devices in the assigned order,
- means for displaying a graphical visualization of relationships between at least a subset of the data records retrieved from the stored data set,
- means for sensing adjustment by the user of one or more of the query devices, and
- means for updating the graphical visualization based on adjustments of the query devices sensed by the means for sensing.

* * * * *

UNITED STATES PATENT AND TRADEMARK OFFICE
CERTIFICATE OF CORRECTION

| | | |
|---|---|---|
| PATENT NO. | : 7,216,116 B2 | Page 1 of 1 |
| APPLICATION NO. | : 09/865163 | |
| DATED | : May 8, 2007 | |
| INVENTOR(S) | : Nilsson et al. | |

It is certified that error appears in the above-identified patent and that said Letters Patent is hereby corrected as shown below:

At column 29, line 55, "older" should read --order--.

Signed and Sealed this

Third Day of July, 2007

JON W. DUDAS
*Director of the United States Patent and Trademark Office*